(12) United States Patent
Nagai

(10) Patent No.: US 8,049,094 B2
(45) Date of Patent: Nov. 1, 2011

(54) REPRODUCTION DEVICE, REPRODUCTION METHOD, AND PROGRAM

(75) Inventor: Hiromasa Nagai, Tokyo (JP)

(73) Assignee: Sony Corporation, Tokyo (JP)

( * ) Notice: Subject to any disclaimer, the term of this patent is extended or adjusted under 35 U.S.C. 154(b) by 237 days.

(21) Appl. No.: 12/446,687

(22) PCT Filed: Oct. 23, 2007

(86) PCT No.: PCT/JP2007/070586
§ 371 (c)(1),
(2), (4) Date: Apr. 22, 2009

(87) PCT Pub. No.: WO2008/050734
PCT Pub. Date: May 2, 2008

(65) Prior Publication Data
US 2010/0023143 A1 Jan. 28, 2010

(30) Foreign Application Priority Data

Oct. 23, 2006 (JP) ................. 2006-287742

(51) Int. Cl.
*G10H 1/00* (2006.01)
*G10H 1/18* (2006.01)
*G10H 7/00* (2006.01)

(52) U.S. Cl. .......................................... 84/615; 700/94
(58) Field of Classification Search .............. 84/601, 84/615; 700/94
See application file for complete search history.

(56) References Cited

U.S. PATENT DOCUMENTS 6,084,169 A * 7/2000 Hasegawa et al. ............. 84/600
7,382,973 B2 * 6/2008 Katsumata .................... 386/239

(Continued)

FOREIGN PATENT DOCUMENTS
EP   1 655 736 A1   5/2006
(Continued)

OTHER PUBLICATIONS

Supplemental European Search Report of Application No. EP 07 83 0320, dated Sep. 8, 2009.

(Continued)

*Primary Examiner* — Jeffrey Donels
(74) *Attorney, Agent, or Firm* — Finnegan, Henderson, Farabow, Garrett & Dunner, L.L.P.

(57) ABSTRACT

The present invention relates to a reproduction device, a reproduction method, and a program capable of automatically reproducing music, which has been reproduced at the time of pickup of an image, along with reproduction of the image. A reproduction device 11 includes a data storage unit 22 that stores data items of pieces of music, data items of images to which time instants at which the images are produced are appended, and a history table having pieces of music, which have been reproduced in the past, and time instants, at which the pieces of music have been reproduced, associated with each other. A time instant at which an image is produced is acquired from the data of the image, which has reproduction thereof instructed by a user, out of the data items of the images stored in the data storage unit 22. The history table stored in the data storage unit 22 is referenced. Based on the time instants at which the pieces of music have been reproduced and the time instant at which the image is produced, music to be reproduced together with the image is determined. The present invention can be applied to, for example, a digital camera having a music reproduction function.

9 Claims, 14 Drawing Sheets

HISTORY TABLE

| FILE NAME | REPRODUCTION TIME INSTANT | ARTIST NAME |
|---|---|---|
| COMPOSITION a | 2006/06/20_14:10 | ARTIST A |
| COMPOSITION b | 2006/06/20_14:13 | ARTIST B |
| COMPOSITION c | 2006/06/20_14:17 | ARTIST C |
| COMPOSITION d | 2006/06/20_14:22 | ARTIST B |
| COMPOSITION e | 2006/06/20_14:25 | ARTIST B |
| COMPOSITION f | 2006/06/20_14:28 | ARTIST A |
| ⋮ | ⋮ | ⋮ |
| | | |

U.S. PATENT DOCUMENTS

| | | | |
|---|---|---|---|
| 7,865,840 B2 * | 1/2011 | Matsuzawa et al. | 715/808 |
| 2002/0033889 A1 | 3/2002 | Miyazaki | |
| 2006/0101339 A1 * | 5/2006 | Katsumata | 715/730 |

FOREIGN PATENT DOCUMENTS

| | | |
|---|---|---|
| JP | 2002-93119 | 3/2002 |
| JP | 2002-093119 | 3/2002 |
| JP | 2003-111031 | 4/2003 |
| JP | 2006-67269 | 3/2006 |
| JP | 2006-134146 | 5/2006 |
| JP | 2006-179069 | 7/2006 |
| JP | 2006-189977 | 7/2006 |
| WO | WO 2007/004139 A2 | 1/2007 |

OTHER PUBLICATIONS

"The Olympus m:robe MR-500i—a Musical Memory Maker," Olympus mr:robe: Digital Photography Review, XP-002544309, pp. 1-3, (2009).

"Basic Manual of Olympus m:robe MR-500i," Olympus Imaging Corp., XP-002544308, pp. 1-117, (2004).

* cited by examiner

[FIG. 1]
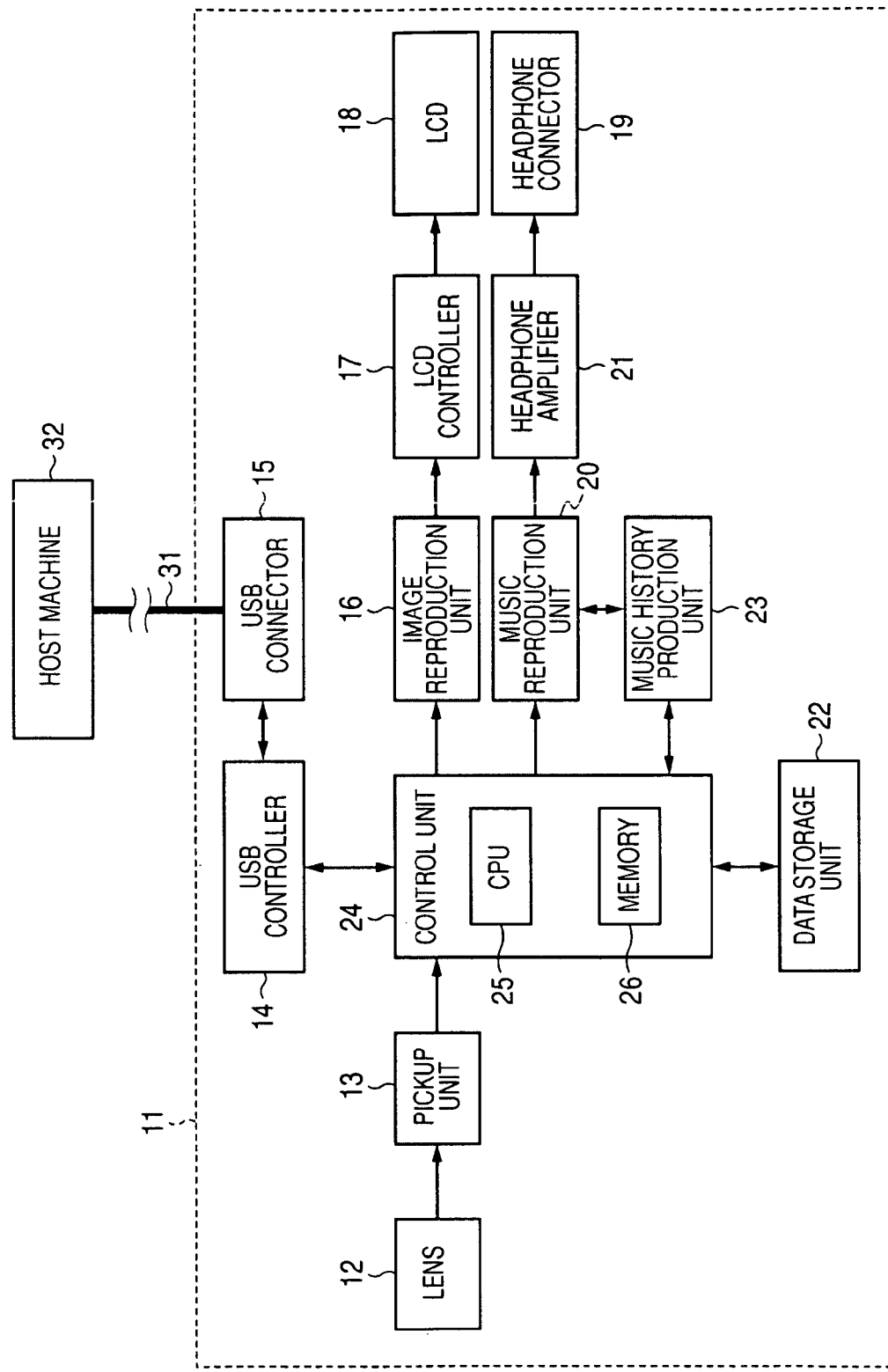

[FIG. 2]
| HISTORY TABLE |||
| --- | --- | --- |
| FILE NAME | REPRODUCTION TIME INSTANT | ARTIST NAME |
| COMPOSITION a | 2006/06/20_14:10 | ARTIST A |
| COMPOSITION b | 2006/06/20_14:13 | ARTIST B |
| COMPOSITION c | 2006/06/20_14:17 | ARTIST C |
| COMPOSITION d | 2006/06/20_14:22 | ARTIST B |
| COMPOSITION e | 2006/06/20_14:25 | ARTIST B |
| COMPOSITION f | 2006/06/20_14:28 | ARTIST A |
| ⋮ | ⋮ | ⋮ |
|  |  |  |
[FIG. 3]
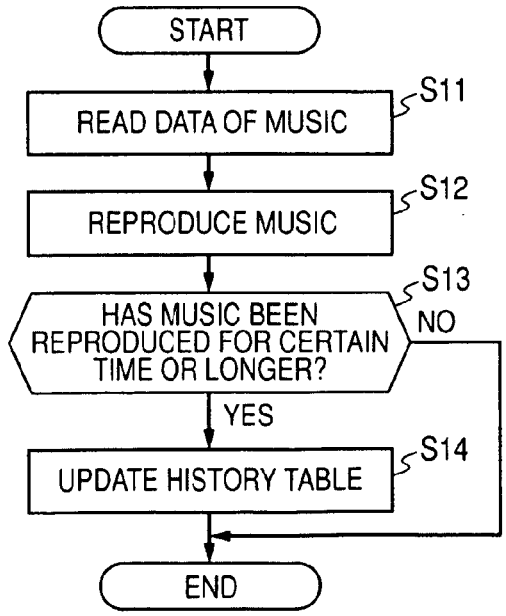

[FIG. 4]
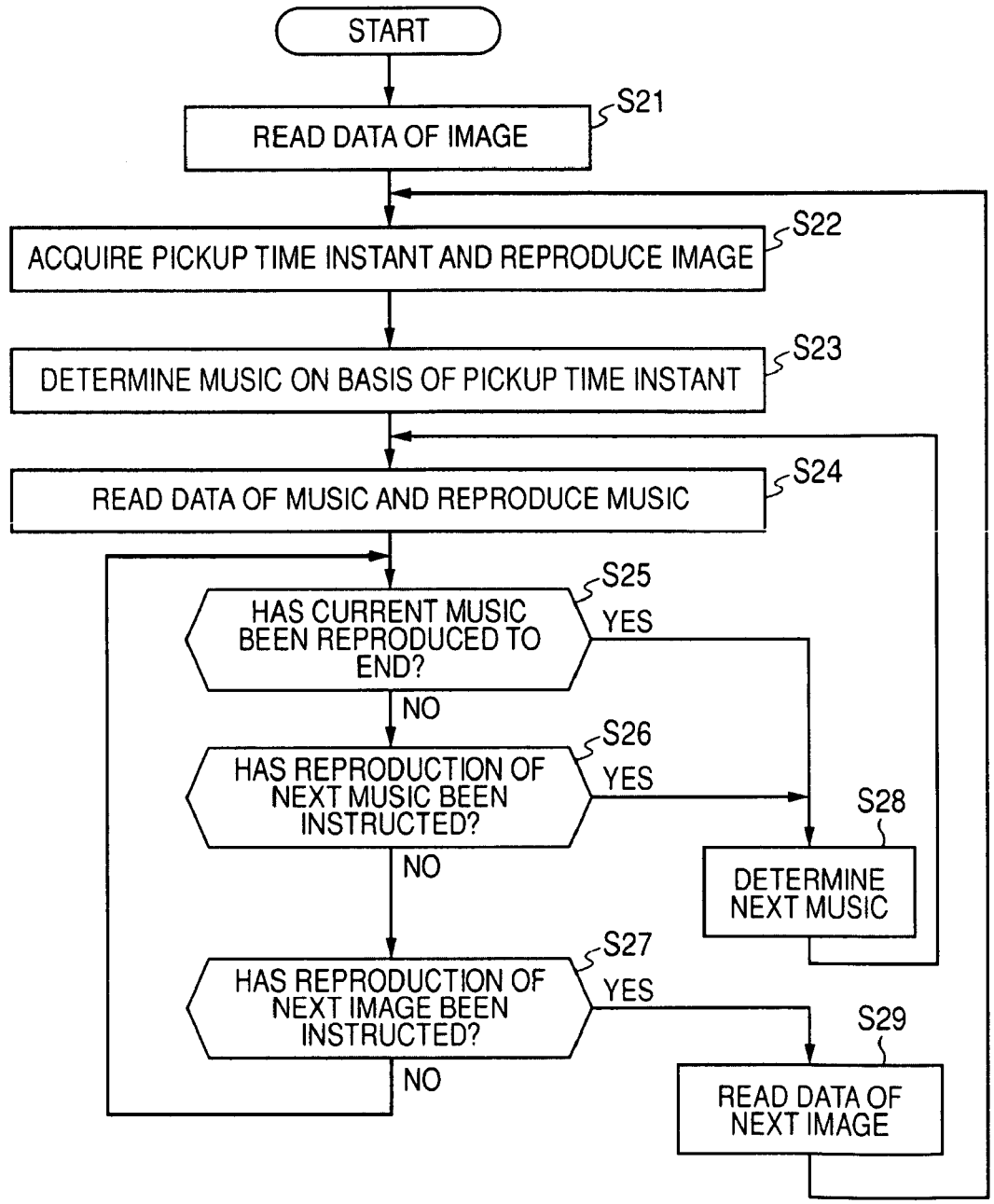

[FIG. 5]
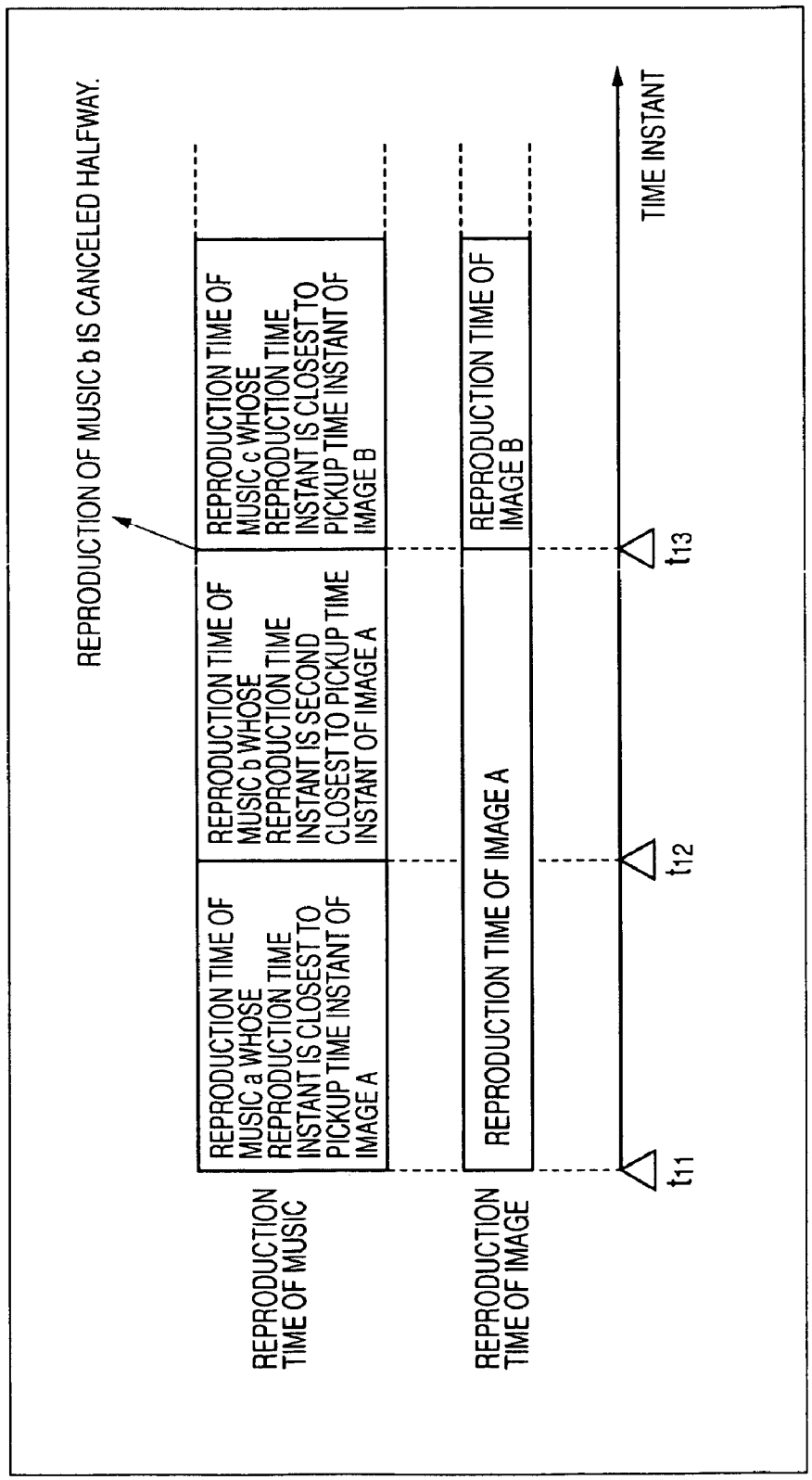

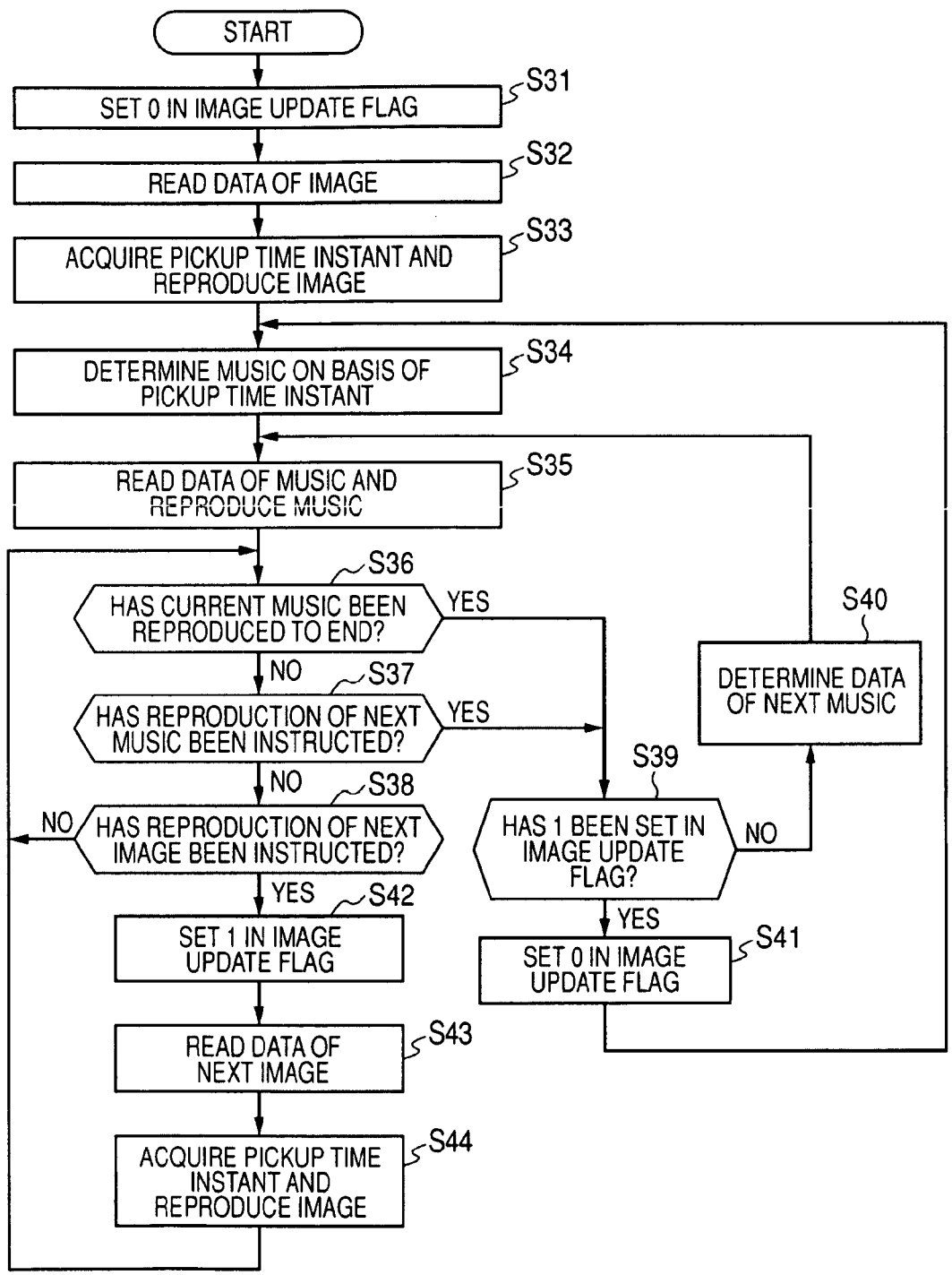
[FIG. 6]

[FIG. 7]
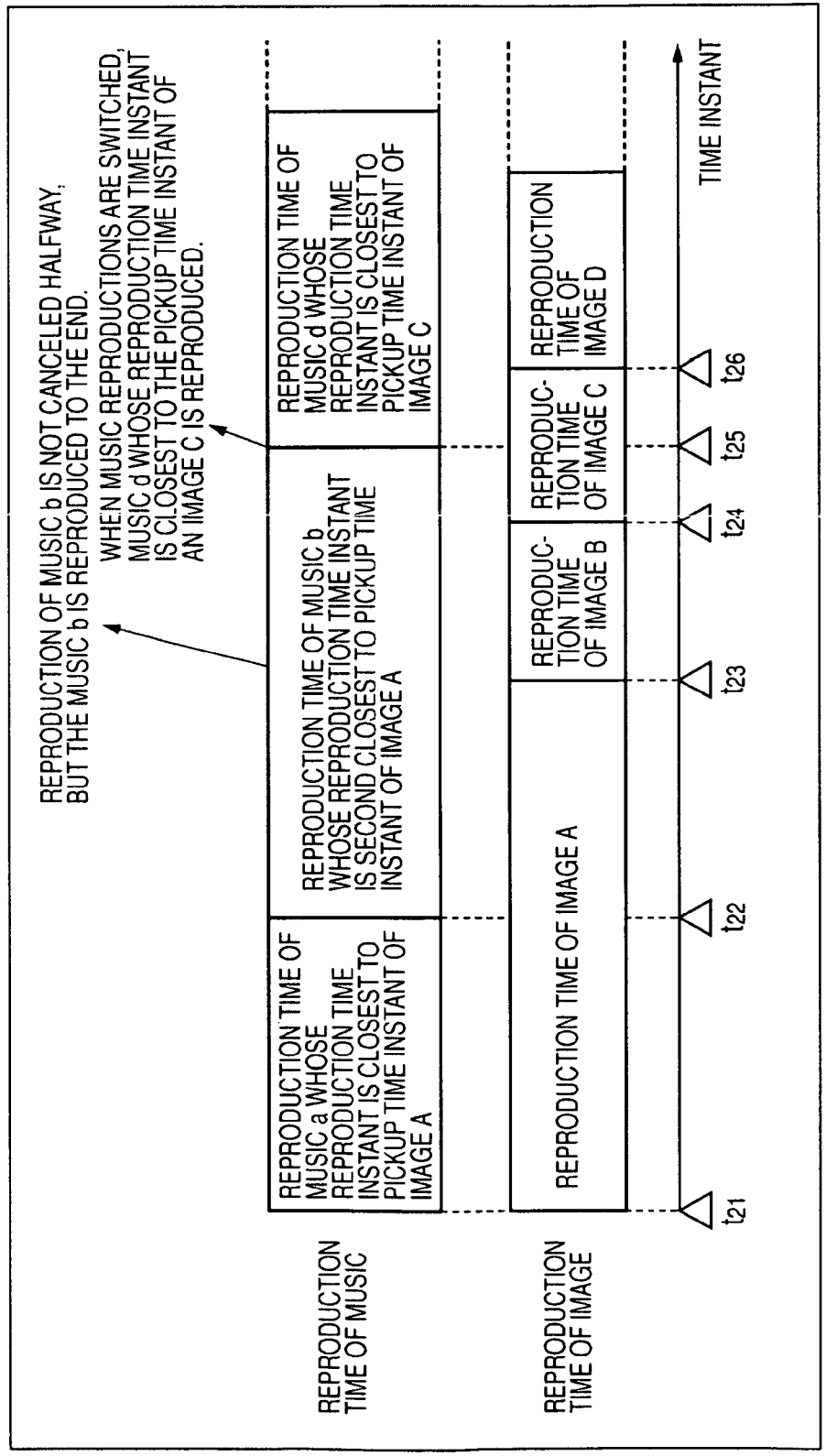

[FIG. 8]
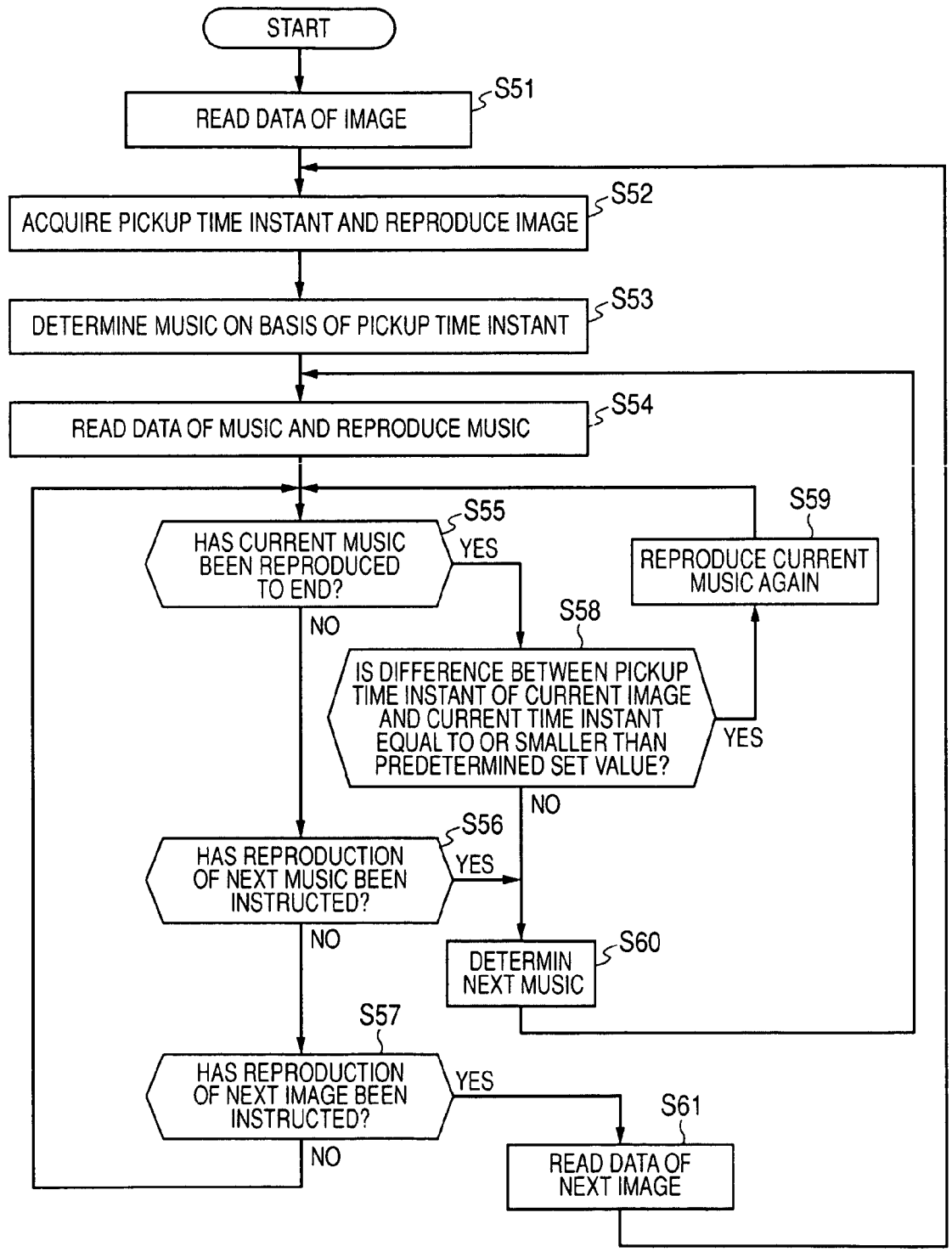

[FIG. 9]
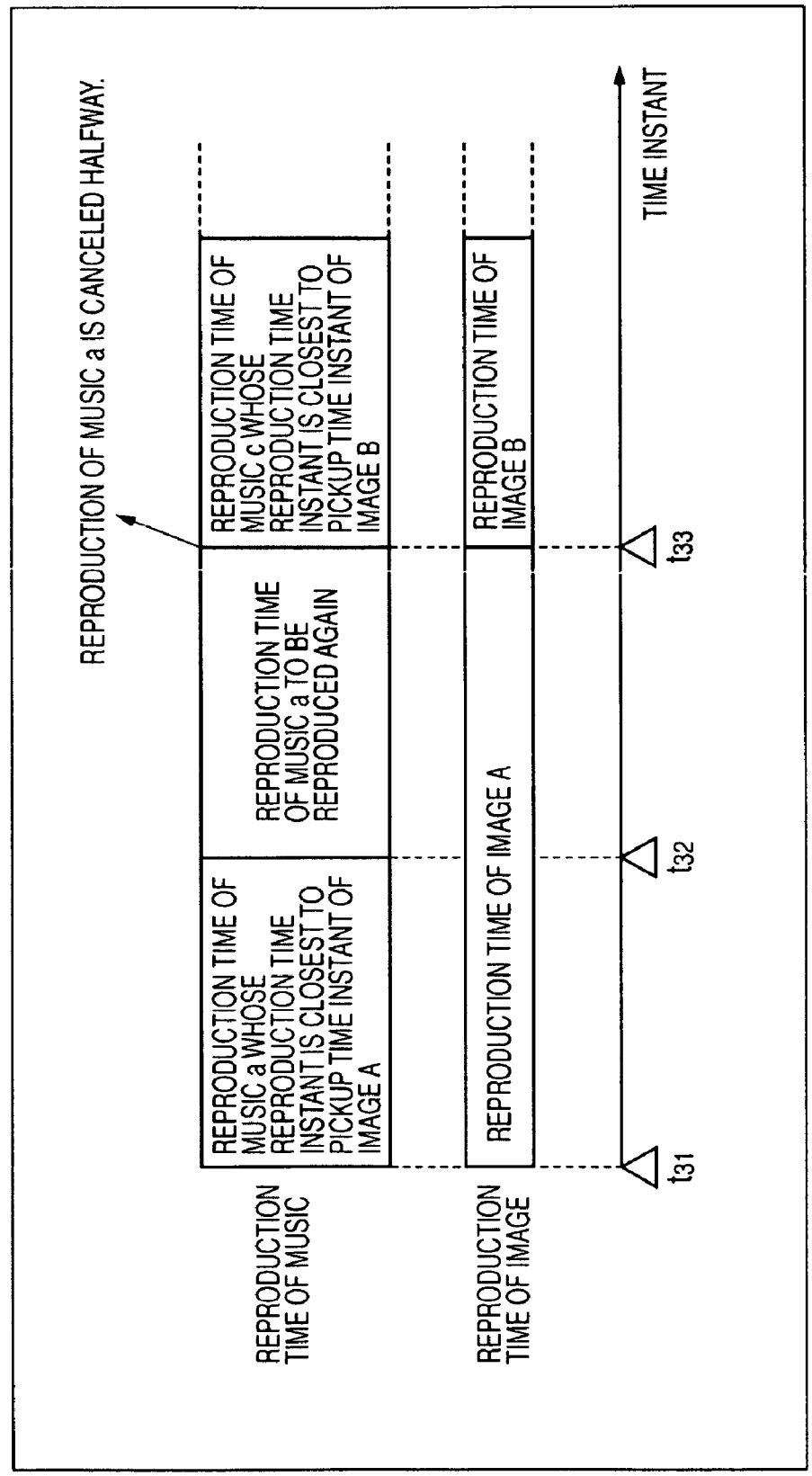

[FIG. 10]
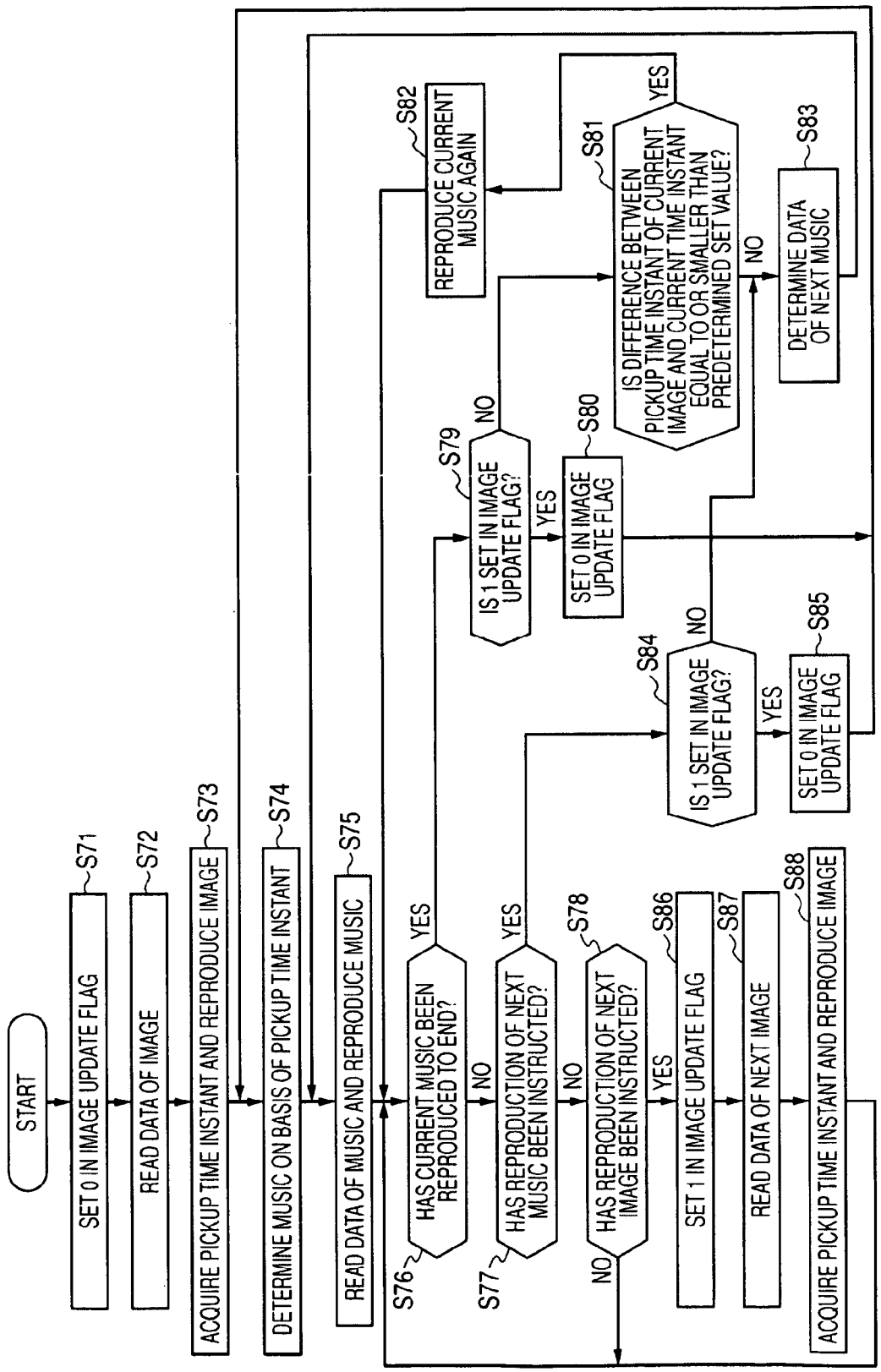

[FIG. 11]
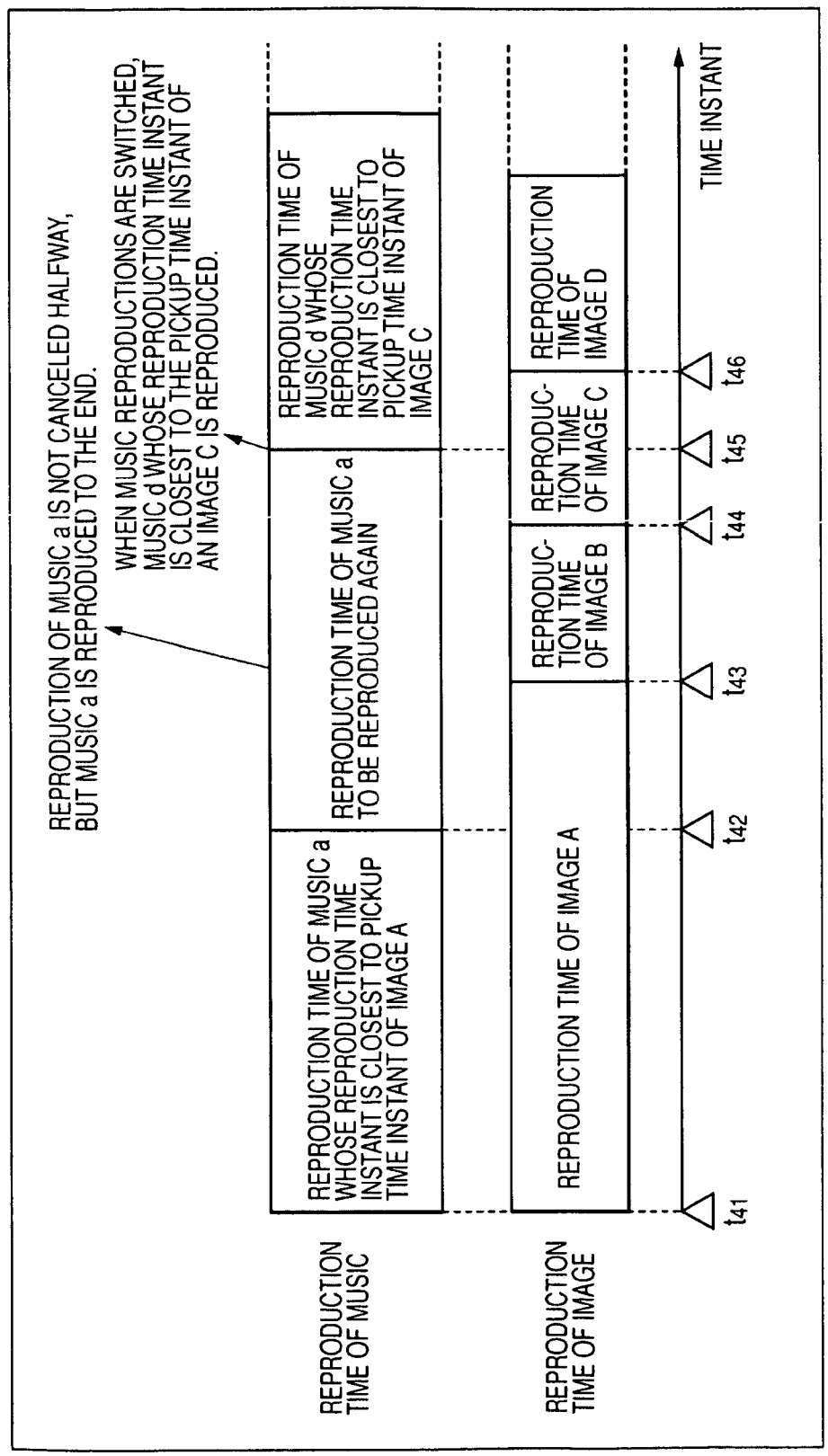

[FIG. 12]
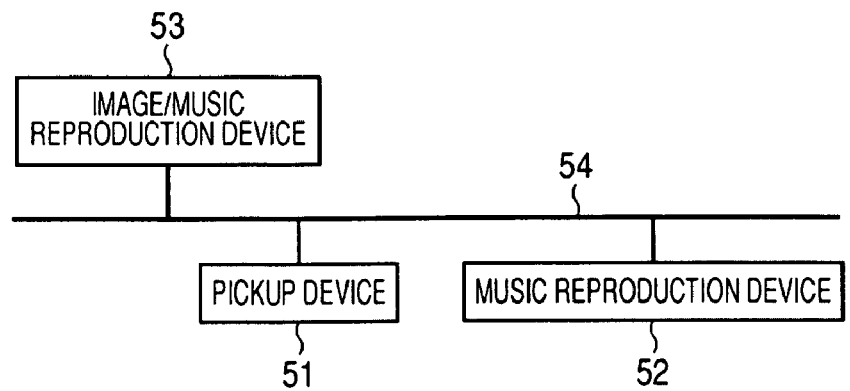
[FIG. 13]
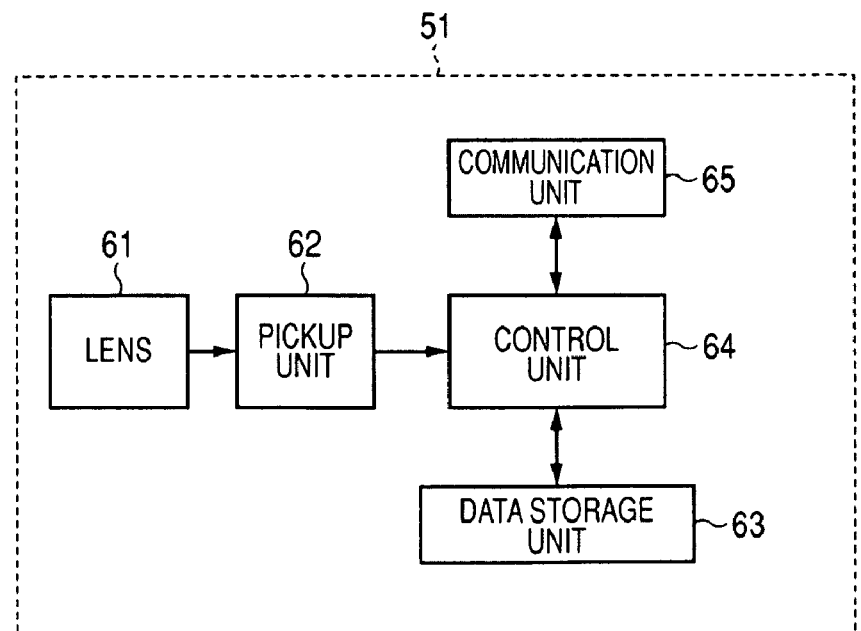

[FIG. 14]
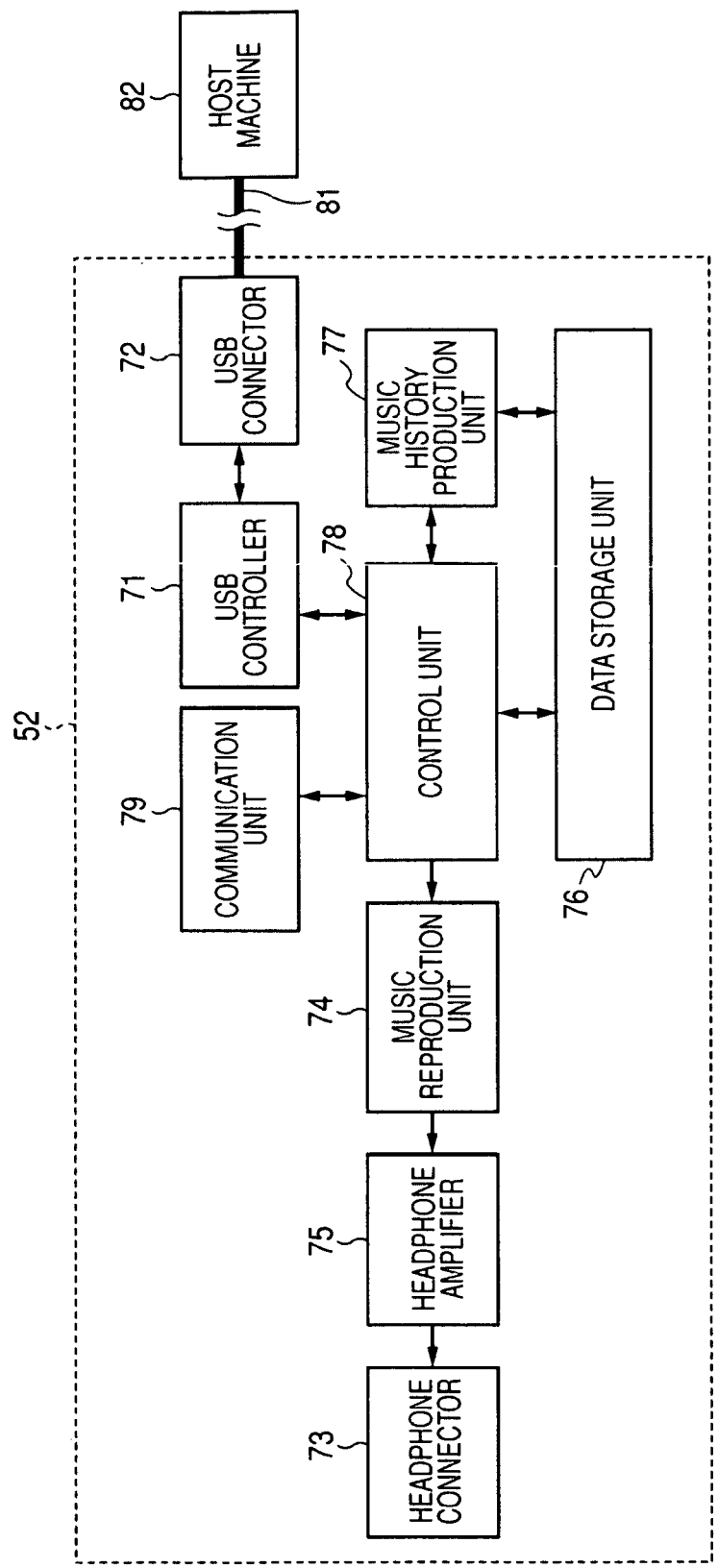

[FIG. 15]
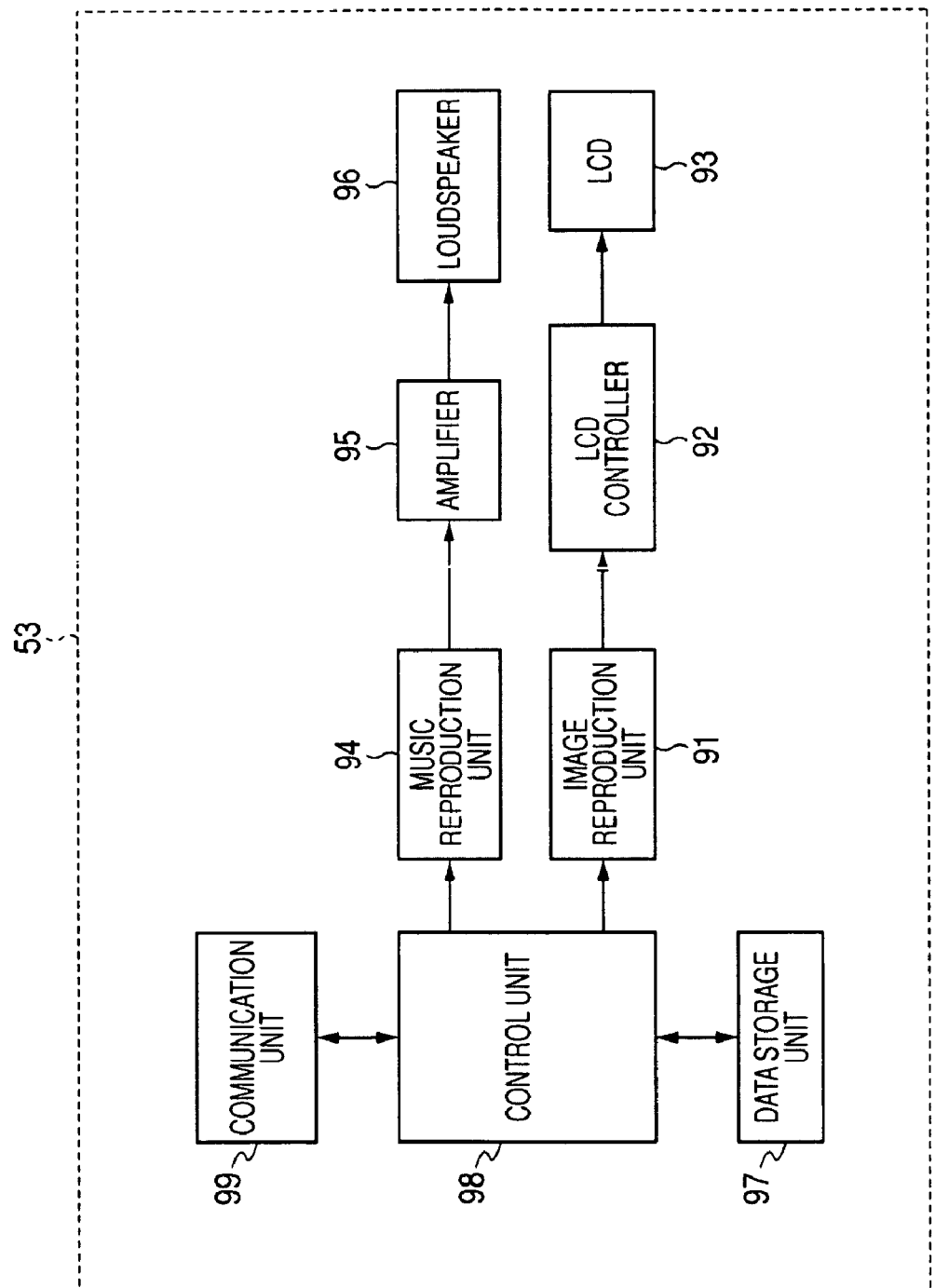

[FIG. 16]
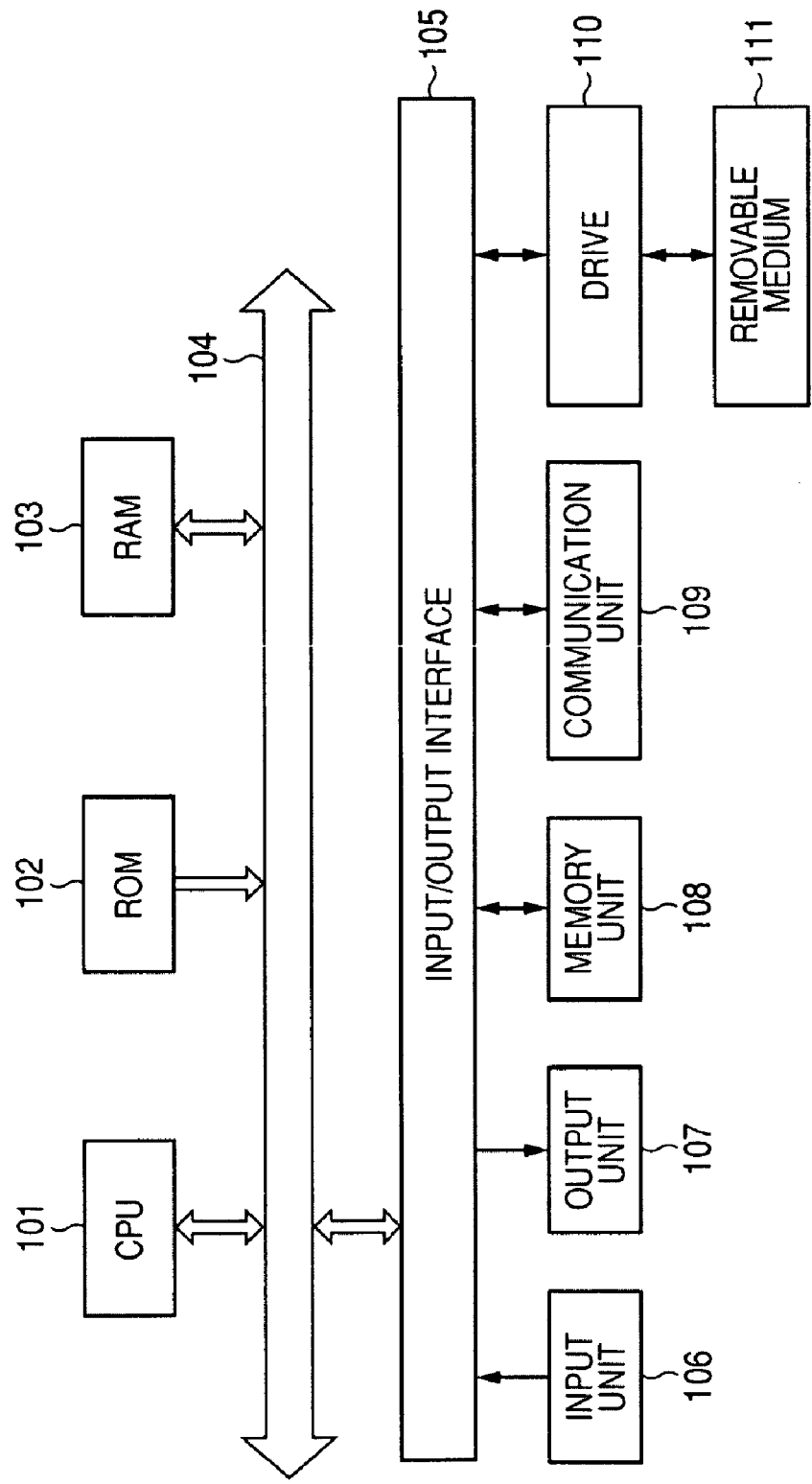

REPRODUCTION DEVICE, REPRODUCTION METHOD, AND PROGRAM

CROSS REFERENCE TO RELATED APPLICATIONS

This application is a national phase application based on PCT/JP2007/070586, filed Oct. 23, 2007, which claims the priority of Japanese Patent Application No. 2006-287742, filed Oct. 23, 2006, the contents of both of which are incorporated herein by reference.

1. Technical Field

The present invention relates to a reproduction device, a reproduction method, and a program. More particularly, the present invention is concerned with a reproduction device, a reproduction method, and a program capable of automatically reproducing music, which has been reproduced at the time of pickup of an image, for example, along with reproduction of the image.

2. Background Art

Conventionally, when reproducing predetermined music is instructed by a user, reproduction devices that reproduce music and images reproduce the music and output the music through a headphone or the like. When reproducing a predetermined image is instructed by the user, the image is reproduced and displayed on a display or the like.

The reproduction device can store data of music and data of an image in association with each other. When reproducing certain music is instructed by a user, the reproduction device reproduces the music designated by the user, reads the data of the image associated with the data of the music, and reproduces the image. If data of an image is not associated with data of music designated by the user, an arbitrary image is reproduced (refer to, for example, a patent document 1).

Patent document 1: JP-A-2006-67269

DISCLOSURE OF THE INVENTION

Problem to be Solved by the Invention

However, in the conventional reproduction device, when music is reproduced and an image associated with the music is reproduced, or when an image is reproduced and music associated with the image is reproduced, a user has to operate the reproduction device so as to associate data of the music with data of the image.

Namely, for example, when an image is picked up while certain music is being reproduced, if the music should be reproduced along with reproduction of the image, data of the music and data of the image have to be associated with each other in advance. The association is labor-intensive for a user.

The present invention addresses the foregoing situation, and is intended to make it possible to automatically reproduce music, for example, which has been reproduced at the time of pickup of an image, along with reproduction of the image.

Means for Solving the Problem

A reproduction device in accordance with one aspect of the present invention is a reproduction device that reproduces music data and image data. The reproduction device includes: a data storage means that stores the music data items, the image data items to which production dates of the image data items are appended, and reproduction history data items that are data items having the music data items and the reproduction dates of the music data items associated with each other; an acquisition means that acquires a production date appended to image data, which has reproduction thereof instructed, out of the image data items stored in the data storage means; and a determination means that references the reproduction history data items stored in the data storage means, and determines the music data, which is reproduced together with the image data, on the basis of the reproduction dates of the music data items registered in the reproduction history data items, and the production date of the image data acquired by the acquisition means.

A reproduction method or a program in accordance with one aspect of the present invention is a reproduction method for reproducing music data and image data or a program that causes a computer to execute reproducing processing of music data and image data. The reproduction method or program includes the steps of: acquiring a production date appended to the image data, which has reproduction thereof instructed, out of the image data items stored in a data storage means that stores the music data items, the image data items to which production dates of the image data items are appended, and reproduction history data items that are data items having the music data items and the reproduction dates of the music data items associated with each other; and referencing the reproduction history data items stored in the data storage means, and determining the music data, which is reproduced together with the image data, on the basis of the reproduction dates of the music data items registered in the reproduction history data items, and the production date of the image data having reproduction thereof instructed.

According to one aspect of the present invention, out of the image data items stored in the data storage means that stores music data items, image data items to which production dates of the image data items are appended, and reproduction history data items that are data items having the music data items and reproduction dates of the music data items associated with each other, a production date appended to image data having reproduction thereof instructed is acquired. The reproduction history data items stored in the data storage means are referenced in order to determine music data, which is reproduced together with the image data, on the basis of the reproduction dates of music data items registered in the reproduction history data items and the production date of the image data having reproduction thereof instructed.

ADVANTAGE OF THE INVENTION

According to one aspect of the present invention, along with reproduction of an image, music that has been reproduced at the time of pickup of the image can be automatically reproduced.

BRIEF DESCRIPTION OF THE DRAWINGS

FIG. 1 is a block diagram showing an example of the configuration of an embodiment of a reproduction device to which the present invention is applied.

FIG. 2 shows an example of a history table stored in a data storage unit 22.

FIG. 3 is a flowchart describing a process in which the history table is updated.

FIG. 4 is a flowchart describing a process of reproducing images and pieces of music.

FIG. 5 shows an example of reproduction times of images and pieces of music to be reproduced by a reproduction device 11.

FIG. 6 is a flowchart describing a process of reproducing images and pieces of music.

FIG. 7 shows an example of reproduction times of images and pieces of music to be reproduced by the reproduction device 11.

FIG. 8 is a flowchart describing a process of reproducing images and pieces of music.

FIG. 9 shows an example of reproduction times of images and pieces of music to be reproduced by the reproduction device 11.

FIG. 10 is a flowchart describing a process of reproducing images and pieces of music.

FIG. 11 shows an example of reproduction times of images and pieces of music to be reproduced by the reproduction device 11.

FIG. 12 is a block diagram showing a system having a pickup device 51, a music reproduction device 52, and an image/music reproduction device 53 interconnected over a network 54.

FIG. 13 is a block diagram showing an example of the configuration of the pickup device 51.

FIG. 14 is a block diagram showing an example of the configuration of the music reproduction device 52.

FIG. 15 is a block diagram showing an example of the configuration of the image/music reproduction device 53.

FIG. 16 is a block diagram showing an example of the configuration of a personal computer that runs a program so as to execute a series of pieces of processing.

DESCRIPTION OF REFERENCE NUMERALS

11: reproduction device, 12: lens, 13: pickup unit, 14: USB controller, 15: USB connector, 16: image reproduction unit, 17: LCD controller, 18: LCD, 19: headphone connector, 20: music reproduction unit, 21: headphone amplifier, 22: data storage unit, 23: music history production unit, 24: control unit, 25: CPU, 26: memory, 31: USB cable, 32: host machine.

BEST MODE FOR CARRYING OUT THE INVENTION

Referring to the drawings, an exemplary embodiment to which the present invention is applied will be described below.

FIG. 1 is a block diagram showing an example of the configuration of an embodiment of a reproduction device to which the present invention is applied.

A reproduction device 11 is, for example, a digital camera having a music reproduction function. In FIG. 1, the reproduction device 11 includes a lens 12, a pickup unit 13, a universal serial bus (USB) controller 14, a USB connector 15, an image reproduction unit 16, a liquid crystal display (LCD) controller 17, an LCD 18, a headphone connector 19, a music reproduction unit 20, a headphone amplifier 21, a data storage unit 22, a music history production unit 23, and a control unit 24.

A host machine 32 such as a personal computer that provides the reproduction device 11 with data of music or the like is connected to the reproduction device 11 over a USB cable 31.

The lens 12 concentrates incident light, which comes from a subject, on the light receiving surface of an image pickup that is not shown and included in the pickup unit 13.

The pickup unit 13 includes the image pickup such as a charge coupled device (CCD) or a complementary metal-oxide semiconductor (CMOS) sensor, and picks up an image. The pickup unit 13 stores data of an image, which results from pickup of an image, in the data storage unit 22 via the control unit 24.

The USB controller 14 communicates with the host machine 32, which is connected to the reproduction device by way of the USB connector 15 and USB cable 31, in compliance with the USB standard under the control of the control unit 24. The USB controller 14 receives data of music sent from, for example, the host machine 32, and stores the data of the music in the data storage unit 22 via the control unit 24.

The USB connector 15 is a junction to which the USB cable 31 linking the reproduction device 11 and host machine 32 is joined.

Data of an image which the control unit 24 reads from the data storage unit 22 is fed to the image reproduction unit 16. The image reproduction unit 16 decodes the data of the image, which is fed from the control unit 24, under the control of the control unit 24, reproduces the image, and feeds the image to the LCD controller 17.

The LCD controller 17 controls the LCD 18 so that the image fed from the image reproduction unit 16 will be displayed on the LCD 18.

The LCD 18 displays the image, which is reproduced by the image reproduction unit 16, under the control of the LCD controller 17.

The headphone connector 19 is a junction to which a terminal of a headphone (not shown), which outputs music, is joined.

Data of music read from the data storage unit 22 by the control unit 24 is fed to the music reproduction unit 20. The music reproduction unit 20 decodes the data of the music, which is fed from the control unit 24, under the control of the control unit 24, reproduces the music, and feeds the music to the headphone amplifier 21.

The headphone amplifier 21 amplifies the music (music signal), which is fed from the music reproduction unit 20, so that the music will be outputted from the headphone, which is plugged into the headphone connector 19, with a predetermined volume, and outputs the music from the headphone through the headphone connector 19.

The data storage unit 22 is formed with a recording medium such as a hard disk or a flash memory, and stores (records) data items of images, which are picked up by the pickup unit 13, and data items of pieces of music which are received by the USB controller 14. The data storage unit 22 stores a history table (FIG. 2), in which pieces of music having been reproduced in the past by the music reproduction unit 20, and the reproduction time instants (reproduction dates) of the pieces of music (for example, the time instants at which reproductions of the respective pieces of music are initiated) are registered while being associated with each other.

Under the control of the control unit 24, the music history production unit 23 registers in the history table, which is stored in the data storage unit 22, music that has been reproduced by the music reproduction unit 20, and the reproduction time instant of the music in association with each other, and thus updates (produces) the history table.

The control unit 24 includes a central processing unit (CPU) 25 and a memory 26. When the CPU 25 runs a program recorded in the memory 26, the components of the reproduction device 11 are controlled.

For example, if music has been reproduced by the music reproduction unit 20 for a predetermined time or longer, the control unit 24 controls the music history production unit 23 so that the music and the reproduction time instant will be associated with each other and registered in the history table stored in the data storage unit 22.

When data of an image is fed from the pickup unit 13, the control unit 24 stores the data of the image in the data storage unit 22 in an exchangeable image file format (Exif) conformable to the design rule for camera file system (DCF) In the Exif, the time instant at which the image is picked up (hereinafter, referred to as a pickup time instant) is appended to the data of the image.

Further, when reproducing a predetermined image is instructed by a user, the control unit 24 reads data of the image, which is designated by the user, from among the data items of images stored in the data storage unit 22, and feeds the data to the image reproduction unit 16 so that the image will be reproduced. Further, the control unit 24 references the history table stored in the data storage unit 22, and determines, for example, music, which has been reproduced at the time instant at which the image designated by the user is picked up, as music, which is reproduced together with the image, on the basis of the reproduction time instant of the music registered in the history table, and the pickup time instant appended to the data of the image read from the data storage unit 22. The control unit 24 then reads the data of the music from the data storage unit 22, and feeds the data to the music reproduction unit 20 so that the music will be reproduced.

FIG. 2 shows an example of a history table stored in the data storage unit 22.

In the history table, "filenames" of pieces of music that have been reproduced in the past, "reproduction time instants" indicating the dates and time instants on and at which the pieces of music have been reproduced, and "artist names" of artists who provide the pieces of music are registered in association with one another.

In the example of the history table shown in FIG. 2, in the first upmost entry (record), a filename "composition a," a reproduction time instant "2006/06/20_14:10," and an artist name "artist A" are recorded in association with one another. In the second upmost entry, a filename "composition b," a reproduction time instant "2006/06/20_14:13," and an artist name "artist B" are registered in association with one another. In the third upmost entry, a filename "composition c," a reproduction time instant "2006/06/20_14:17," and an artist name "artist C" are registered in association with one another. In the fourth upmost entry, a filename "composition d," a reproduction time instant "2006/06/20_14:22," and an artist name "artist B" are registered in association with one another. In the fifth upmost entry, a filename "composition e," a reproduction time instant "2006/06/20_14:25," and an artist name "artist B" are registered in association with one another. In the sixth upmost entry, a filename "composition f," a reproduction time instant "2006/06/20_14:28," and an artist name "artist A" are registered in association with one another.

In the history table, when certain music is reproduced, a new entry is sequentially produced below (next to) the registered entries. The "filename" of the music, "reproduction time instant" thereof, and "artist name" thereof are registered in association with one another.

In the reproduction device 11 in FIG. 1 having the foregoing history table, when reproducing an image is instructed by a user, the image reproduction unit 16 reproduces the image designated by the user. At the same time, the history table is referenced based on the pickup time instant of the image. The control unit 24 retrieves music that has been reproduced at the time of pickup of the image, and the music reproduction unit 20 reproduces the music.

FIG. 3 is a flowchart describing a process in which the history table is updated in the reproduction device 11 shown in FIG. 1.

When reproducing music is instructed by a user, at step S11, the control unit 24 reads data of the music designated by the user from the data storage unit 22, and feeds the data to the music reproduction unit 20.

After the processing of step S11 is completed, the process proceeds to step S12. The music reproduction unit 20 decodes the data of the music fed from the control unit 24 at step S11, and reproduces the music. The process then proceeds to step S13.

At step S13, the control unit 24 decides whether the music has been reproduced for a certain time or longer (for example, 30 sec or 1 min). For example, after the music reproduction unit 20 initiates reproduction of music at step S12, if stopping the music or reproducing the next music is instructed by the user within a certain time, the control unit 24 decides that the music has not been reproduced for the certain time or longer.

As the certain time used to decide whether music has been reproduced, 30 sec, 1 min, or any other predetermined time may be adopted. Otherwise, for example, a time determined for each music, for example, a time that is a predetermined percent such as 10% of the entire time of music to be reproduced by the music reproduction unit 20 (for example, 36 sec for music of 6 min long) may be adopted.

If the control unit 24 decides at step S13 that music has been reproduced for the certain time or longer, the process proceeds to step S14.

At step S14, the music history production unit 23 registers in the history table, which is stored in the data storage unit 22, the filename of music, which is reproduced by the music reproduction unit 20, and the reproduction time instant of the music in association with each other under the control of the control unit 24, and thus updates the history table. After the processing of step S14 is completed, the process is terminated.

In contrast, if the control unit 24 decides at step S13 that music has not been reproduced for the certain time or longer, the step S14 is skipped. The history table is not updated but the process is terminated.

FIG. 4 is a flowchart describing a process of reproducing images and pieces of music in the reproduction device 11 shown in FIG. 1.

If reproducing an image is instructed by a user, the control unit 24 reads at step S21 data of the image, which is designated by the user, from the data storage unit 22. The process proceeds to step S22.

At step S22, the control unit 24 feeds the data of the image read from the data storage unit 22 to the image reproduction unit 16, and acquires the pickup time instant of the image appended to the data of the image. The image reproduction unit 16 decodes the data of the image fed from the control unit 24, and reproduces the image.

After the processing of step S22 is completed, the process proceeds to step S23. The control unit 24 references the history table, which is stored in the data storage unit 22, on the basis of the pickup time instant of the image acquired at step S22, and determines music to be reproduced together with the image reproduced at step S22.

For example, the control unit 24 retrieves a reproduction time instant, of which difference value from the pickup time instant of the image acquired at step S22 is minimal, from among reproduction time instants registered in the history table stored in the data storage unit 22, and determines music of the filename, which is associated with the reproduction time instant obtained as a result of the retrieval, as music to be reproduced together with the image.

To be more specific, assuming that the pickup time instant of the image acquired at step S22 is 14:18 on Jun. 20, 2006, the control unit 24 retrieves a reproduction time instant, of which difference value from the pickup time instant is minimal, from among reproduction time instants registered in the history table shown in FIG. 2. The control unit 24 determines music of the filename "composition c," which is associated with the reproduction time instant "2006/06/20_14:17" obtained as a result of the retrieval, as music to be reproduced together with the image.

After the processing of step S23 is completed, the process proceeds to step S24. The control unit 24 reads data of the music, which is determined at step S23, from the data storage unit 22, and feeds the data to the music reproduction unit 20. The music reproduction unit 20 decodes the data of the music fed from the control unit 24, and reproduces the music. The process then proceeds to step S25.

At step S25, the control unit 24 decides whether the music reproduced immediately previously at step S24 (hereinafter, referred to as current music) has been reproduced to the end.

If the control unit 24 decides at step S25 that the current music has not been reproduced to the end, the process proceeds to step S26. The control unit 24 decides whether reproducing music to be reproduced next to the current music (hereinafter, referred to as the next music) has been instructed by a user.

If the control unit 24 decides at step S26 that reproducing the next music has not been instructed by the user, the process proceeds to step S27. The control unit 24 decides whether reproducing an image to be reproduced next to the image reproduced immediately previously at step S22 (hereinafter, referred to as the next image) has been instructed by the user.

If the control unit decides at step S27 that reproducing the next image has not been instructed by the user, the process returns to step S25.

Namely, at steps S25 to S27, the control unit 24 stands by for processing until a decision is made that the current music has been reproduced to the end, that reproducing the next music has been instructed by the user, or that reproducing the next image has been instructed by the user.

If the control unit 24 decides at step S25 that the current music has been reproduced to the end, or if the control unit 24 decides at step S26 that reproducing the next music has been instructed by the user, the process proceeds to step S28.

At step S28, similarly to the processing of step S23, the control unit 24 references the history table, which is stored in the data storage unit 22, on the basis of the pickup time instant of the image acquired at step S22, and determines the next music.

For example, the control unit 24 retrieves a reproduction time instant, of which difference value from the pickup time instant of the image acquired at step S22 is the second smallest below that of the reproduction time instant of the current music, from among reproduction time instants registered in the history table stored in the data storage unit 22, and determines music of a filename, which is associated with the reproduction time instant obtained as a result of the retrieval, as music to be reproduced together with the image.

After the processing of step S28 is completed, the process returns to step S24. The same pieces of processing are repeated. In this case, at step S24, the control unit 24 reads data of the music, which has reproduction thereof determined at step S28, from the data storage unit 22, and feeds the data to the music reproduction unit 20.

On the other hand, if the control unit 24 decides at step S27 that reproducing the next image has been instructed by the user, the process proceeds to step S29. The control unit 24 reads data of the image designated by the user from the data storage unit 22. The process then returns to step S22, and the same pieces of processing are repeated. In this case, at step S22, the control unit 24 feeds the data of the image, which is read at step S29, to the image reproduction unit 16, and acquires the pickup time instant appended to the data of the image.

As mentioned above, when reproducing an image is instructed by a user, the reproduction device 11 references the history table on the basis of the pickup time instant of the image designated by the user, and determines music to be reproduced together with the image. For example, when the reproduction device 11 determines music of a reproduction time instant, of which difference value from the pickup time instant of the image designated by the user is minimal, as music to be reproduced together with the image, the difference value between the reproduction time instant of music, which has been reproduced when the image designated by the user is picked up, and the pickup time instant of the image is minimal. Therefore, the reproduction device 11 can reproduce music, which has been reproduced when an image is picked up, together with the image.

For example, as far as the conventional reproduction device is concerned, unless a user operates the reproduction device so as to associate an image with music, the music that has been reproduced when the image is picked up cannot be reproduced. In contrast, the reproduction device 11 can automatically reproduce music, which has been reproduced when an image is picked up, by referencing the history table, but the user need not associate an image with music.

As mentioned above, for example, assuming that a user picks up an image while reproducing music, when the image is reproduced, the music having been reproduced at the time of pickup of the image is reproduced. In this case, the user can more clearly recall the time when the user has picked up the image than the user can when only the image is reproduced.

FIG. 5 shows an example of reproduction times of images and pieces of music to be reproduced in the reproduction device 11 by executing the process described in the flowchart of FIG. 4.

On the upper side of FIG. 5, the reproduction times of pieces of music to be reproduced by the music reproduction unit 20 are specified. On the lower side of FIG. 5, reproduction times of images to be reproduced by the image reproduction unit 16 are specified. Passage of time instants is expressed from left to right sideways in FIG. 5.

For example, assuming that a user instructs reproduction of an image A at a time instant $t_{11}$, the control unit 24 reads data of the image A, which is designated by the user, from the data storage unit 22 (processing of step S21 in FIG. 4). The control unit 24 acquires the pickup time instant of the image A from the data of the image A, and the image reproduction unit 16 reproduces the image A and displays the image A on the LCD 18 (processing of step S22 in FIG. 4).

The control unit 24 references the history table, which is stored in the data storage unit 22, determines music a, which has been reproduced at a time instant whose difference value from the pickup time instant of the image A is minimal, as music to be reproduced together with the image A (processing of step S23 in FIG. 4). The music reproduction unit 20 reproduces the music a (processing of step S24 in FIG. 4).

Thereafter, at a time instant $t_{12}$, the music a shall be reproduced to the end. In this case, the control unit 24 decides that the music a has been reproduced to the end (processing of step S25 in FIG. 4). Music b that has been reproduced at a time instant whose difference value from the pickup time instant of the image A is the second smallest below that of the music a is determined as music to be reproduced together with the image A (processing of step S28 in FIG. 4). The music reproduction unit 20 reproduces the music b.

Further, thereafter, at a time instant $t_{13}$ in the middle of reproduction of the music b, if an image B is designated as an image, which is reproduced next to the image A, by the user, the control unit 24 decides that reproducing the next image has been instructed by the user (processing of step S27 in FIG. 4), and reads data of the image B from the data storage unit 22 (processing of step S29 in FIG. 4).

The control unit 24 acquires the pickup time instant of the image B from the data of the image B. The image reproduction unit 16 reproduces the image B (processing of step S22 in FIG. 4). Further, the control unit 24 references the history table stored in the data storage unit 22, and determines music c, which has been reproduced at a time instant whose difference value from the pickup time instant of the image B is minimal, as music to be reproduced together with the image B (processing of step S23 in FIG. 4). The music reproduction unit 20 cancels reproduction of the music b halfway and reproduces the music c (processing of step S24 in FIG. 4).

As mentioned above, in the reproduction device 11, the music a that has been reproduced at the time instant whose difference value from the pickup time instant of the image A is minimal is reproduced along with reproduction of the image A, and the music c that has been reproduced at the time instant whose difference value from the pickup time instant of the image B is minimal is reproduced along with reproduction of the image B.

In the reproduction device 11, if reproduction of the next image is instructed in the middle of reproduction of music, the reproduction is canceled in the middle of the music. Music relevant to the pickup time instant of the next image is reproduced. For example, some users may not like to have reproduction canceled in the middle of music.

FIG. 6 is a flowchart describing a process in which if reproduction of the next image is instructed during reproduction of music, after the music is reproduced to the end, the next music is reproduced in the reproduction device 11 shown in FIG. 1.

If reproducing an image is instructed by a user, the control unit 24 initializes an image update flag of one bit long that signifies whether the next image has been reproduced during reproduction of music, that is, sets "0," which signifies that the next image has not been reproduced during reproduction of music, in the image update flag. Incidentally, the image update flag is recorded (stored) in the memory 26 included in the control unit 24.

After the processing of step S31 is completed, the process proceeds to step S32. The control unit 24 reads data of an image, which is designated by the user, from the data storage unit 22. The process then proceeds to step S33.

At step S33, the control unit 24 feeds the data of the image, which is read from the data storage unit 22 at step S32, to the image reproduction unit 16, and acquires the pickup time instant of the image appended to the data of the image. The image reproduction unit 16 decodes the data of the image fed from the control unit 24, and reproduces the image.

After the processing of step S33 is completed, the process proceeds to step S34. The control unit 24 references the history table, which is stored in the data storage unit 22, on the basis of the pickup time instant of the image acquired at step S33, and determines music to be reproduced together with the image reproduced at step S33.

For example, the control unit 24 retrieves, similarly to the processing of step S24 in FIG. 4, a reproduction time instant, of which difference value from the pickup time instant of the image acquired at step S33 is minimal, from among reproduction time instants, which are registered in the history table stored in the data storage unit 22, and determines music of a filename, which is associated with the reproduction time instant obtained as a result of the retrieval, as music to be reproduced together with the image.

After the processing of step S34 is completed, the process proceeds to step S35. The control unit 24 reads the data of the music, which is determined at step S34, from the data storage unit 22, and feeds the data to the music reproduction unit 20. The music reproduction unit 20 decodes the data of the music fed from the control unit 24, and reproduces the music. The process then proceeds to step S36.

At steps S36 to S38, similarly to the pieces of processing of steps S25 to S27 in FIG. 4, the control unit 24 stands by for processing until a decision is made that the current music has been reproduced to the end, that reproducing the next music has been instructed by a user, or that reproducing the next image has been instructed by a user.

If the control unit 24 decides at step S36 that the current music has been reproduced to the end, or if the control unit 24 decides at step S37 that it has been instructed to reproduce the next music by a user, the process proceeds to step S39.

At step S39, the control unit 24 decides whether "1" signifying that the next image has been reproduced during reproduction of music is set in the image update flag.

For example, if reproducing the next image has been instructed by a user during reproduction of the current music, a decision is made at step S38 that reproducing the next image has been instructed by the user. At step S42 to be described later, "1" signifying that the next image has been reproduced during reproduction of music is set in the image update flag. The control unit 24 decides that "1" signifying that the next image has been reproduced during reproduction of music is set in the image update flag.

On the other hand, for example, unless reproducing the next image has been instructed by a user during reproduction of the current music, "0" that has been set at step S31 is still set in the image update flag. The control unit 24 decides that "1" signifying that the next image has been reproduced during reproduction of current music is not set in the image update flag.

If the control unit 24 decides at step S39 that "1" signifying that the next image has been reproduced during reproduction of current music is not set in the image update flag, the process proceeds to step S40.

At step S40, similarly to the processing of step S28 in FIG. 4, the control unit 24 determines music to be reproduced next. The process returns to step S35, and the same pieces of processing are repeated. In this case, at step S35, the control unit 24 reads data of the music, which is determined to be reproduced at step S40, from the data storage unit 22, and feeds the data to the music reproduction unit 20.

On the other hand, if the control unit 24 decides at step that "1" signifying that the next image has been reproduced during reproduction of current music is set in the image update flag, the process proceeds to step S41.

At step S41, the control unit 24 resets the image update flag, that is, sets "0," which signifies that the next image has not been reproduced during reproduction of current music, in the image update flag. The process returns to step S34, and the same pieces of processing are repeated. Namely, since the next music is newly reproduced at step S35, the control unit 24 resets the image update flag. In this case, at step S34, the control unit 24 determines the next music on the basis of the pickup time instant of the next image that has been reproduced during reproduction of the current music (pickup time instant acquired at step S44 to be described later).

On the other hand, if the control unit 24 decides at step S38 that it has been instructed to reproduce the next image by a user, the process proceeds to step S42. The control unit 24 sets "1," which signifies that the next image has been reproduced during reproduction of current music, in the image update flag.

After the processing of step S42 is completed, the process proceeds to step S43. The control unit 24 reads data of the next image, which is designated by the user, from the data storage unit 22. The process then proceeds to step S44.

At step S44, the control unit 24 feeds the data of the image, which is read from the data storage unit 22, to the image reproduction unit 16, and acquires the pickup time instant appended to the data of the image. The process then returns to step S36, and the same pieces of processing are repeated. The pickup time instant acquired at step S44 is employed in the processing of step S34 succeeding step S39 at which the control unit 24 decides that "1" signifying that the next image has been reproduced during reproduction of music is set in the image update flag.

As mentioned above, when the reproduction device 11 reproduces music along with reproduction of an image, even when the next image is reproduced during reproduction of the music, after the music whose reproduction has been initiated is reproduced to the end, music relevant to the pickup time instant of the next image is reproduced. Therefore, it can be avoided that reproduction of music is canceled halfway.

FIG. 7 shows an example of reproduction times of images and pieces of music to be reproduced in the reproduction device 11 by executing the process described in the flowchart of FIG. 6.

On the upper side of FIG. 7, reproduction times of pieces of music to be reproduced by the music reproduction unit 20 are specified. On the lower side of FIG. 7, reproduction times of images to be reproduced by the image reproduction unit 16 are specified. Passage of time instants is expressed from left to right sideways in FIG. 7.

For example, assuming that a user instructs at a time instant $t_{21}$ that an image A should be reproduced, the control unit 24 sets "0" in the image update flag (processing of step S31 in FIG. 6), and reads the data of the image A designated by the user from the data storage unit 22 (processing of step S32 in FIG. 6). The control unit 24 acquires the pickup time instant of the image A from the data of the image A, and the image reproduction unit 16 reproduces the image A and displays the image A on the LCD 18 (processing of step S33 in FIG. 6).

The control unit 24 references the history table storage in the data storage unit 22, determines music a, which has been reproduced at a time instant whose difference value from the pickup time instant of the image A is minimal, as music to be reproduced together with the image A (processing of step S34 in FIG. 6). The music reproduction unit 20 reproduces the music a (processing of step S35 in FIG. 6).

Thereafter, at a time instant $t_{22}$, the music a shall be reproduced to the end. In this case, the control unit 24 decides that the music a has been reproduced to the end (processing of step S36 in FIG. 6). Since the image is not updated during a period from the time instant $t_{21}$ to the time instant $t_{22}$, that is, for the reproduction time of the music a and "0" is left set in the image update flag, the control unit 24 decides that "1" is not set in the image update flag (processing of step S39 in FIG. 6), and determines music b, which has been reproduced at a time instant whose difference value from the pickup time instant of the image A is the second smallest below that of the music a, as music to be reproduced together with the image A (processing of step S40 in FIG. 6). The music reproduction unit 20 reproduces the music b.

Thereafter, if an image B is designated as an image, which is reproduced next to the image A, by the user at a time instant $t_{23}$ in the middle of reproduction of the music b, the control unit 24 decides that it has been instructed to reproduce the next image by the user (processing of step S38 in FIG. 6), sets "1" in the image update flag (processing of step S42 in FIG. 6) and reads the data of the image B from the data storage unit 22 (processing of step S43 in FIG. 6). The control unit 24 then acquires the pickup time instant of the image B from the data of the image B, and the image reproduction unit 16 reproduces the image B (processing of step S44 in FIG. 6).

If an image C is designated as an image, which is reproduced next to the image B, by the user at a time instant $t_{24}$ in the middle of reproduction of the music b, processing is performed in the same manner as the processing in which the image B is reproduced at the time instant $t_{23}$. The image C is reproduced.

Thereafter, at a time instant $t_{25}$, the music b shall be reproduced to the end. In this case, the control unit 24 decides that the music b has been reproduced to the end (processing of step S36 in FIG. 6). The image is updated during a period from the time instant $t_{22}$ to time instant $t_{25}$, that is, for the reproduction time of the music b, and "1" is set in the image update flag. The control unit 24 therefore decides that "1" is set in the image update flag (processing of step S39 in FIG. 6), and determines music d, which has been reproduced at a time instant whose difference value from the pickup time instant of the image C is the smallest, as music to be reproduced together with the image C (processing of step S40 in FIG. 6). The music reproduction unit 20 reproduces the music d.

At a time instant $t_{26}$ succeeding the time instant $t_{25}$, the control unit 24 reproduces an image D responsively to user s manipulations.

As mentioned above, in the reproduction device 11, even when the next image B or image C is reproduced during reproduction of the music b, after the music b is reproduced to the end, the music d relevant to the pickup time instant of the image C is reproduced.

As described by referring to FIG. 5 and FIG. 7, in the reproduction device 11, if the music a that has been reproduced at a time instant whose difference value from the pickup time instant of the image A is minimal is reproduced to the end during the reproduction time of the image A, the music b that has been reproduced at a time instant whose difference value from the pickup time instant of the image A is the second smallest below that of the music a is reproduced.

For example, if the pickup time instant of the image A is separated by, for example, one year or longer from a time instant at which the user has instructed that the image A should be reproduced (that is, for example, the time instant $t_{11}$ in FIG. 5 or the time instant $t_{21}$ in FIG. 7) (hereinafter, may be referred to as an image reproduction time instant), the user will not presumably concern about the difference between the reproduction time instant of the music a and the reproduction time instant of the music b. When the image A is reproduced, if the music b is reproduced successively to reproduction of the music a, the user will not presumably be hindered from recalling the time when the user has picked up the image A.

In contrast, for example, assuming that the pickup time instant of the image A and the image reproduction time instant are separated from each other by only several days, the user will presumably concern about the difference between the reproduction time instant of the music a and the reproduction time instant of the music b. When the image A is reproduced, if the music b that has not been reproduced at the time of pickup of the image A is reproduced successively to reproduction of the music a, the user will presumably be hinder from recalling the time when the user has picked up the image A.

Namely, for example, as long as the pickup time instant of the image A and the image reproduction time instant fall within a certain period of several days or so, after the music a reproduced together with the image A is reproduced to the end, the music a should be reproduced again. In this case, the user will presumably recall the time of pickup of the image A more clearly than when the music b is reproduced next to the music a.

Referring to FIG. 8 to FIG. 11, a process of determining music on the basis of the difference between the pickup time instant of an image and the image reproduction time instant in the reproduction device 11 will be described below.

FIG. 8 is a flowchart describing the process in which music is determined based on the difference between the pickup time instant of an image and the image reproduction time instant in the reproduction device 11, that is, the process in which, similarly to the process in FIG. 4, when reproduction of the next image is instructed during reproduction of music, reproduction of the music is canceled and music relevant to the pickup time instant of the next image is reproduced.

In the reproduction device 11, at steps S51 to S54, similarly to the pieces of processing of steps S21 to S24 in FIG. 4, music of a reproduction time instant whose difference value from the pickup time instant of an image designated by a user is minimal is reproduced.

At steps S55 to S57, similarly to the pieces of processing of steps S25 to S27 in FIG. 4, the control unit 24 stands by for processing until a decision is made that current music has been reproduced to the end, that reproducing the next music has been instructed by a user, or that reproducing the next image is instructed by the user.

If the control unit 24 decides at step S55 that the current music has been reproduced to the end, the process proceeds to step S58.

At step S58, the control unit 24 decides whether the difference between the pickup time instant of the current image and the image reproduction time instant is equal to or smaller than a predetermined set value. As for the predetermined set value, the user can designate an arbitrary period, for example, several days, one month, or one year.

If the control unit 24 decides at step S58 that the difference between the pickup time instant of the current image and the image reproduction time instant is equal to or smaller than the predetermined set value, the process proceeds to step S59. The control unit 24 controls the music reproduction unit 20 so that the music reproduction unit 20 will reproduce the current music again. The process returns to step S55, and the same pieces of processing are repeated.

On the other hand, if the control unit 24 decides at step that the difference between the pickup time instant of the current image and the image reproduction time instant is not equal to or smaller than the predetermined set value (is larger than the predetermined set value), the process proceeds to step S60.

At step S60, similarly to the processing of step S28 in FIG. 4, the control unit 24 determines music next to the current music. The process returns to step S54.

Even if the control unit 24 decides at step S56 that reproducing the next music has been instructed by the user, the process proceeds to step S60. The same pieces of processing as the foregoing ones are carried out.

On the other hand, if the control unit 24 decides at step S57 that reproducing the next image has been instructed by the user, the process proceeds to step S61. Similarly to the processing of step S29 in FIG. 4, the control unit 24 reads data of the next image from the data storage unit 22. The process returns to step S52.

As mentioned above, as long as the difference between the pickup time instant of a current image and the image reproduction time instant is equal to or smaller than the predetermined set value, the reproduction device 11 repeatedly reproduces the current music. When the time instant at which an image is picked up and the time instant at which the image is reproduced are close to each other, music that has been reproduced at the time of pickup of the image is repeatedly reproduced. A user can more clearly recall the time when the image has been picked up.

FIG. 9 shows an example of reproduction times of images and pieces of music to be reproduced in the reproduction device 11 by executing the process described in the flowchart of FIG. 8.

On the upper side of FIG. 9, reproduction times of pieces of music to be reproduced by the music reproduction unit 20 are specified. On the lower side of FIG. 9, reproduction times of images to be reproduced by the image reproduction unit 16 are specified. Passage of time instants is expressed from left to right sideways in FIG. 9. FIG. 9 shows a case where the difference between the image reproduction time instant and the pickup time instant of the image A is equal to or smaller than the predetermined set value.

For example, assuming that a user instructs at a time instant $t_{31}$ that the image A should be reproduced, the control unit 24 reads data of the image A designated by the user from the data storage unit 22 (processing of step S51 in FIG. 8). The control unit 24 acquires the pickup time instant of the image A from the data of the image A, and the image reproduction unit 16 reproduces the image A and displays the image A on the LCD 18 (processing of step S52 in FIG. 8).

The control unit 24 references the history table stored in the data storage unit 22, and determines music a, which has been reproduced at a time instant whose difference value from the pickup time instant of the image A is minimal, as music to be reproduced together with the image A (processing of step S53 in FIG. 8). The music reproduction unit 20 reproduces the music a (processing of step S54 in FIG. 8).

Thereafter, at a time instant $t_{32}$, the music a shall be reproduced to the end. In this case, the control unit 24 decides that the music a has been reproduced to the end (processing of step S55 in FIG. 8) and decides that the difference between the image reproduction time instant and the pickup time instant of the image A is equal to or smaller than the predetermined set value (processing of step S58 in FIG. 8). Therefore, the control unit 24 controls the music reproduction unit 20 so that the music reproduction unit will reproduce the music a again.

Thereafter, at a time instant $t_{33}$ in the middle of reproduction of the music a, if an image B is designated by the user as an image to be reproduced next to the image A, the control unit 24 decides that reproducing the next image has been instructed by the user (processing of step S57 in FIG. 8), and reads data of the image B from the data storage unit 22 (processing of step S61 in FIG. 8).

The control unit 24 acquires the pickup time instant of the image B from the data of the image B, and the image reproduction unit 16 reproduces the image B (processing of step S52 in FIG. 8). Further, the control unit 24 references the history table stored in the data storage unit 22, and determines music c, which has been reproduced at a time instant whose difference value from the pickup time instant of the image B is minimal, as music to be reproduced together with the image B (processing of step S53 in FIG. 8). The music reproduction unit 20 cancels reproduction of the music a halfway and reproduces the music c.

As mentioned above, in the reproduction device 11, as long as the difference between the image reproduction time instant and the pickup time instant of the image A is equal to or smaller than the predetermined set value, the music a is repeatedly reproduced.

FIG. 10 is a flowchart describing a process in which music is determined based on the difference between the pickup time instant of an image and an image reproduction time instant in the reproduction device 11, that is, a process in which, similarly to the process in FIG. 6, when reproduction of the next image is instructed during reproduction of music, after the music is reproduced to the end, music relevant to the pickup time instant of the next image is reproduced.

In the reproduction device 11, at steps S71 to S75, similarly to the pieces of processing of steps S31 to S35 in FIG. 6, "0" signifying that the next image has not been reproduced during reproduction of music is set in the image update flag. Music of a reproduction time instant whose difference value from the pickup time instant of an image designated by a user is minimal is reproduced.

At steps S76 to S78, similarly to the pieces of processing of steps S36 to S38 in FIG. 6, the control unit 24 stands by for processing until a decision is made that current music has been reproduced to the end, that reproducing the next music has been instructed by a user, or that reproducing the next image has been instructed by a user.

If the control unit 24 decides at step S76 that the current music has been reproduced to the end, the process proceeds to step S79. The control unit 24 decides whether "1" signifying that the next image has been reproduced during reproduction of music is set in the image update flag.

If the control unit 24 decides at step S79 that "1" signifying that the next image has been reproduced during reproduction of music is set in the image update flag, the process proceeds to step S80. Similarly to the processing of step S41 in FIG. 6, the control unit 24 sets "0" signifying that the next image has not been reproduced during reproduction of current music. The process returns to step S74, and the same pieces of processing are repeated.

On the other hand, if the control unit 24 decides at step S79 that "1" signifying that the next image has been reproduced during reproduction of music is not set, the process proceeds to step S81. The control unit 24 decides whether the difference between the pickup time instant of the current image and the image reproduction time instant is equal to or smaller than the predetermined set value.

If the control unit 24 decides at step S81 that the difference between the pickup time instant of the current image and the image reproduction time instant is equal to or smaller than the predetermined set value, the process proceeds to step S82. The control unit 24 reproduces the current music again. The process returns to step S76, and the same pieces of processing are repeated.

On the other hand, if the control unit 24 decides at step S81 that the difference between the pickup time instant of the current image and the image reproduction time instant is not equal to or smaller than the predetermined set value (is larger than the predetermined set value), the process proceeds to step S83. Similarly to the processing of step S40 in FIG. 6, the control unit 24 determines music that will be next to the current music. The process returns to step S75, and the same pieces of processing are repeated.

On the other hand, if a decision is made at step S77 that the control unit 24 has been instructed to reproduce the next music by the user, the process proceeds to step S84. Similarly to the processing of step S79, the control unit 24 decides whether "1" signifying that the next image has been reproduced during reproduction of music is set in the image update flag.

If the control unit 24 decides at step S84 that "1" signifying that the next image has been reproduced during reproduction of music is set in the image update flag, the process proceeds to step S85. Similarly to the processing of step S41 in FIG. 6, the control unit 24 sets "0" signifying that the next image has not been reproduced during reproduction of current music. The process returns to step S74, and the same pieces of processing are repeated.

On the other hand, if the control unit 24 decides at step S84 that "1" signifying that the next image has been reproduced during reproduction of music is not set in the image update flag, the process proceeds to step S83. The aforesaid pieces of processing are carried out.

If the control unit 24 decides at step S78 that it has been instructed to reproduce the next image by the user, the same pieces of processing as the pieces of processing of steps S42 to S44 in FIG. 6 are carried out at steps S86 to S88.

As mentioned above, as long as the difference between the pickup time instant of a current image and the image reproduction time instant is equal to or smaller than the predetermined set value, the reproduction device 11 can repeatedly reproduce current music. Therefore, when the time instant at which an image is picked up and the time instant at which the image is reproduced are close to each other, music that has been reproduced at the time of pickup of the image is repeatedly reproduced. Therefore, the user can more clearly recall the time when the image has been picked up.

FIG. 11 shows an example of reproduction times of images and pieces of music to be reproduced in the reproduction device 11 by executing the process described in the flowchart of FIG. 10.

On the upper side of FIG. 11, reproduction times of pieces of music to be reproduced by the music reproduction unit 20 are specified. On the lower side of FIG. 11, reproduction times of images to be reproduced by the image reproduction unit 16 are specified. Passage of time instants is expressed from left to right sideways in FIG. 11. FIG. 11 shows a case where the difference between an image reproduction time instant and the pickup time instant of the image A is equal to or smaller than the predetermined set value.

For example, a user shall instruct at a time instant $t_{41}$ that the image A should be reproduced. The control unit 24 sets "0" in the image update flag (processing of step S71 in FIG. 10), and reads data of the image A designated by the user from the data storage unit 22 (processing of step S72 in FIG. 10). The control unit 24 acquires the pickup time instant of the image A from the data of the image A, and the image reproduction unit 16 reproduces the image A and displays the image A on the LCD 18 (processing of step S73 in FIG. 10).

The control unit 24 references the history table stored in the data storage unit 22, and determines music a, which has been reproduced at a time instant whose difference value from the pickup time instant of the image A is minimal, as music to be reproduced together with the image A (processing of step S74 in FIG. 10). The music reproduction unit 20 reproduces the music a (processing of step S75 in FIG. 10).

Thereafter, at a time instant $t_{42}$, the music a shall be reproduced to the end. In this case, the control unit 24 decides that the music a has been reproduced to the end (processing of step S76 in FIG. 10). Since the image has not been updated during a period from the time instant $t_{41}$ to the time instant $t_{42}$ that is the reproduction time of the music a, and "0" is left set in the image update flag, the control unit 24 decides that "1" has not been set in the image update flag (processing of step S79 in FIG. 10), and decides that the difference between the image reproduction time instant and the pickup time instant of the image A is equal to or smaller than the predetermined set value (processing of step S81 in FIG. 10). Therefore, the control unit 24 controls the music reproduction unit 20 so that the music reproduction unit will reproduce the music a again (processing of step S82 in FIG. 10).

Further, thereafter, at a time instant $t_{43}$ in the middle of reproduction of the music a, if an image B is designated as an image, which is reproduced next to the image A, by the user, the control unit 24 decides that it has been instructed to reproduce the next image by the user (processing of step S78 in FIG. 10), sets "1" in the image update flag (processing of step S86 in FIG. 10), and reads data of the image B from the data storage unit 22 (processing of step S87 in FIG. 10). The control unit 24 then acquires the pickup time instant of the image B from the data of the image B, and the image reproduction unit 16 reproduces the image B (processing of step S88 in FIG. 10).

At a time instant $t_{44}$ in the middle of reproduction of the music a, if an image C is designated as an image, which is reproduced next to the image B, by the user, processing is performed in the same manner as processing in which the image B is reproduced at the time instant $t_{43}$. The image C is reproduced.

Thereafter, at a time instant $t_{45}$, the music a shall be reproduced to the end. In this case, the control unit 24 decides that the music a has been reproduced to the end (processing of step S76 in FIG. 10). Since the image has been updated during a period from the time instant $t_{42}$ to the time instant $t_{45}$, that is, the reproduction time of the music a, and "1" is set in the image update flag, the control unit 24 decides that "1" is set in the image update flag (processing of step S79 in FIG. 10), resets the image update flag (processing of step S80 in FIG. 10), and determines music d, which has been reproduced at a time instant whose difference value from the pickup time instant of the image C acquired at the time instant $t_{44}$ is the smallest, as music to be reproduced together with the image C (processing of step S74 in FIG. 10). The music reproduction unit 20 reproduces the music d.

At a time instant $t_{46}$ succeeding the time instant $t_{45}$, the control unit 24 reproduces the image D responsively to user's manipulations.

Thus, in the reproduction device 11, as long as the difference between the image reproduction time instant and the pickup time instant of the image A is equal to or smaller than the predetermined set value, the music a is repeatedly reproduced.

The reproduction device 11 in FIG. 1 can pick up an image, reproduce the image, and reproduce music. For example, in a system in which a device that picks up an image and a device that reproduces an image or a device that reproduces an image and music are interconnected over a network, when the devices execute respective processes, the same functions as those of the reproduction device 11 can be realized.

FIG. 12 is a block diagram showing a system constructed by interconnecting a pickup device 51, a music reproduction device 52, and an image/music reproduction device 53 over a network 54.

The pickup device 51 is, for example, a digital camera, and feeds data of an image, which the pickup device picks up, to the image/music reproduction device 53 over the network 54.

The music reproduction device 52 is, for example, a portable audio player, reproduces music, produces a history table (FIG. 2) of pieces of music which the music reproduction device has reproduced, and feeds the data of music and the history table to the image/music reproduction device 53 over the network 54.

The image/music reproduction device 53 is a device including a monitor and a loudspeaker, for example, a television receiver. To the image/music reproduction device 53, data of an image is fed from the pickup device 51, and data of music and the history table are fed from the music reproduction device 52.

For example, assume that a user picks up an image using the pickup device 51 while reproducing music in the music reproduction device 52. When the image/music reproduction device 53 is manipulated by the user in order to reproduce the image fed from the pickup device 51, the image/music reproduction device 53 reproduces the image, references the history table fed from the music reproduction device 52, and reproduces music that when the image is picked up by the pickup device 51, has been reproduced by the music reproduction device 52.

The network 54 is, for example, a local area network (LAN) formed with a wired or wireless network.

FIG. 13 is a block diagram showing an example of the configuration of the pickup device 51 shown in FIG. 12.

The pickup device 51 includes a lens 61, a pickup unit 62, a data storage unit 63, a control unit 64, and a communication unit 65.

The lens 61, pickup unit 62, data storage unit 63, or control unit 64 included in the pickup device 51 is formed to be identical to the lens 12, pickup unit 13, data storage unit 22, or control unit 24 included in the reproduction device 11 shown in FIG. 1. The communication unit 65 performs communications over the network 54 (FIG. 12) under the control of the control unit 64.

Specifically, in the pickup device 51, light coming from a subject is concentrated on the light receiving surface of an image pickup included in the pickup unit 62 via the lens 61. An image is picked up by the pickup unit 62. Data of the image picked up by the pickup unit 62 is stored in the data storage unit 63 via the control unit 64. In the pickup device 51, the control unit 64 controls the communication unit 65. Communication with the image/music reproduction device 53 (FIG. 12) is performed over the network 54 so that data of an image stored in the data storage unit 63 will be transmitted to the image/music reproduction devise 53.

FIG. 14 is a block diagram showing an example of the configuration of the music reproduction device 52 shown in FIG. 12.

The music reproduction device 52 includes a USB controller 71, a USB connector 72, a headphone connector 73, a music reproduction unit 74, a headphone amplifier 75, a data storage unit 76, a music history production unit 77, a control unit 78, and a communication unit 79.

The USB controller 71, USB connector 72, headphone connector 73, music reproduction unit 74, headphone amplifier 75, data storage unit 76, music history production unit 77, or control unit 78 included in the music reproduction device 52 is formed to be identical to the USB controller 14, USB connector 15, headphone connector 19, music reproduction unit 20, headphone amplifier 21, data storage unit 22, music history production unit 23, or control unit 24 included in the reproduction device 11 shown in FIG. 1. The communication unit 79 performs communications over the network 54 (FIG. 12) under the control of the control unit 78.

To the music reproduction device 52, similarly to the reproduction device 11, a host machine 82 such as a personal computer that provides the music reproduction device 52 with data of music or the like over the USB cable 81 is connected.

Namely, in the music reproduction device 52, when data of music is transmitted from the host machine 82 over the USB cable 81, the control unit 78 controls the USB controller 71. The data of music transmitted from the host machine 82 is received and stored in the data storage unit 76. In the music reproduction device 52, the data of music is read from the data storage unit 76. When the music is reproduced by the music reproduction unit 74, the control unit 78 controls the music history production unit 77. The history table of pieces of music that have been reproduced by the music reproduction unit 74 is produced and stored in the data storage unit 76.

In the music reproduction device 52, the control unit 78 controls the communication unit 79. Communication with the image/music reproduction device 53 (FIG. 12) is performed over the network 54, and the data of music and the history table which are stored in the data storage unit 63 are transmitted to the image/music reproduction device 53.

FIG. 15 is a block diagram showing an example of the configuration of the image/music reproduction device 53 shown in FIG. 12.

The image/music reproduction device 53 includes an image reproduction unit 91, an LCD controller 92, an LCD 93, a music reproduction unit 94, an amplifier 95, a loudspeaker 96, a data storage unit 97, a control unit 98, and a communication unit 99.

The image reproduction unit 91, LCD controller 92, LCD 93, music reproduction unit 94, data storage unit 97, or control unit 98 included in the image/music reproduction device 53 is formed to be identical to the image reproduction unit 16, LCD controller 17, LCD 18, music reproduction unit 20, data storage unit 22, or control unit 97 included in the reproduction device 11 shown in FIG. 1.

The amplifier 95 amplifies music (a music signal) reproduced by the music reproduction unit 94, and feeds the music to the loudspeaker 96. The loudspeaker 96 outputs the music fed from the amplifier 95. The communication unit 99 performs communications over the network 54 (FIG. 12) under the control of the control unit 98.

Specifically, in the image/music reproduction device 53, when data of an image is transmitted from the pickup device 51 over the network 54, the control unit 98 controls the communication unit 99. The data of the image sent from the pickup device 51 is received and stored in the data storage unit 97. In the image/music reproduction device 53, when data of music and the history table are transmitted from the music reproduction device 52 over the network 54, the control unit 98 controls the communication unit 99. The data of music and the history table are received from the music reproduction device 52, and stored in the data storage unit 97.

In the image/music reproduction device 53, when reproducing an image is instructed by a user, the image reproduction unit 91 reproduces an image designated by the user. The control unit 98 references the history table stored in the data storage unit 97, and determines music, which has been reproduced by the music reproduction device 52 when the image designated by the user is picked up by the pickup device 51, as music to be reproduced together with the image. The music is reproduced by the music reproduction unit 94.

As mentioned above, the present invention can be applied to the system constructed to have the pickup device 51, music reproduction device 52, and image/music reproduction device 53 interconnected over the network 54.

Further, the present invention can be applied not only to the system having the devices interconnected over the network but also to a system that, as long as a pickup device and a music reproduction device include a drive into or from which a removable medium can be loaded or unloaded, includes a personal computer, which can receive data of an image, data of music, and a history table via the removable medium, the pickup device, and the music reproduction device. For example, the foregoing series of pieces of processing can be executed by software installed in the personal computer, for example, a slide show.

In order to execute the foregoing series of pieces of processing by software, a program configuring the software is installed from a program recording medium to a computer incorporated in dedicated hardware, or to a general-purpose personal computer, for example, that can execute various functions when having various programs installed therein.

FIG. 16 is a block diagram showing an example of the configuration of a personal computer that executes the foregoing series of pieces of processing by running a program. A central processing unit (CPU) 101 executes various pieces of processing according to a program stored in a read-only memory (ROM) 102 or a memory unit 108. In a random-access memory (RAM) 103, programs to be run by the CPU 101 and data items are stored. The CPU 101, ROM 102, and RAM 103 are interconnected over a bus 104.

To the CPU 101, an input/output interface 105 is connected over the bus 104. To the input/output interface 105, an input unit 106 including a keyboard, a mouse, and a microphone and an output unit 107 including a display and a loudspeaker are connected. The CPU 101 executes various pieces of processing in response to a command inputted via the input unit 106. The CPU 101 outputs the result of processing to the output unit 107.

The memory unit 108 connected to the input/output interface 105 is formed with, for example, a hard disk, and stores programs to be run by the CPU 101 and various data items. A communication unit 109 communicates with external devices over a network such as the Internet or a local area network.

A program may be acquired via the communication unit 109 and then stored in the memory unit 108.

When a removable medium 111 such as a magnetic disk, an optical disk, a magneto-optical disk, or a semiconductor memory is loaded into a drive 110 connected to the input/output interface 105, the drive 110 drives the removable medium and acquires a program or data stored in the removable medium. The acquired program or data is, if necessary, transferred to and stored in the memory unit 108.

The program recording medium that stores a program which is installed in a computer and is executable by the computer is, as shown in FIG. 16, the removable medium 111 that is a packaged medium such as a magnetic disk (including a flexible disk), an optical disk (including a compact disk-read-only memory (CD-ROM) and a digital versatile disc (DVD)), a magneto-optical disk, or a semiconductor memory, the ROM 102 in which a program is tentatively or permanently stored, or a hard disk realizing the memory unit 108. Storage of a program in the program recording medium is carried out via, if necessary, the communication unit 109, which is an interface such as a router or a modem, by utilizing a wired or wireless communication medium such as a local area network, the Internet, or digital satellite broadcasting.

In the history table shown in FIG. 2, filenames of pieces of music are registered. Aside from the filenames of pieces of music, for example, addresses indicating areas in which data items of pieces of music are stored may be registered. In the history table, artist names may not be registered.

An image to be picked up by the reproduction device 11 may be either a still image or a motion picture. The reproduction device 11 can reproduce both the still image and motion picture.

The pieces of processing described with reference to the flowcharts need not be time-sequentially handled according to the sequences described in the respective flowcharts, but include pieces of processing to be handled in parallel with one another or independently of one another (for example, parallel processing or pieces of processing based on objects).

Further, in this specification, what is referred to as a system is the whole of multiple devices.

The embodiment of the present invention is not limited to the foregoing one but can be modified in various manners within a scope without a departure from the gist of the present invention.

The invention claimed is:

1. A reproduction device that reproduces music data and image data, comprising:
   a data storage means that stores the music data items, the image data items to which production dates of the image data items are appended, and reproduction history data items that are data items having the music data items and the reproduction dates of the music data items associated with each other;
   an acquisition means that acquires the production date of image data, which has reproduction thereof instructed, out of the image data items stored in the data storage means;
   a determination means that references the reproduction history data items stored in the data storage means, and determines the music data, which is reproduced together with the image data, on the basis of the reproduction dates of the music data items registered in the reproduction history data items, and the production date of the image data acquired by the acquisition means; and
   a reproduction history production means that produces reproduction history data by associating music data, which is reproduced by a music reproduction means that reproduces music data, and a date, on which the music data has been reproduced, with each other, wherein:
   when the music data has been reproduced by the music reproduction means for a predetermined time or longer, the reproduction history production means produces reproduction history data by associating the music data and a date, on which the music data has been reproduced, with each other.

2. The reproduction device according to claim 1, wherein the determination means determines music data, which has been reproduced on a reproduction date whose difference value from the production date of the image data is minimal, as music data to be reproduced together with the image data.

3. The reproduction device according to claim 1, further comprising a communication means that communicates with another device, wherein:
   the music data items that are received by the communication means and transmitted from another device or the reproduction history data items are stored in the data storage means.

4. The reproduction device according to claim 1, further comprising a pickup means that picks up an image, wherein:
   the production date of the image data is a pickup date of the image data by the pickup means.

5. A reproduction method for reproducing music data and image data, comprising the steps of:
   acquiring a production date appended to the image data, which has reproduction thereof instructed, out of the image data items stored in a data storage means that stores the music data items, the image data items to which production dates of the image data items are appended, and reproduction history data items that are data items having the music data items and reproduction dates of the music data items associated with each other;
   referencing the reproduction history data items stored in the data storage means, and determining the music data, which is reproduced together with the image data, on the basis of the reproduction dates of the music data items registered in the reproduction history data items, and the production date of the image data having reproduction thereof instructed; and
   producing reproduction history data by associating music data, which has been reproduced by a music reproduction means that reproduces music data, with the reproduction date of the music data, wherein:
   when the music data has been reproduced by the music reproduction means for a predetermined time or longer, the reproduction history data is produced by associating the music data and the reproduction date of the music data with each other.

6. The reproduction method according to claim 5, wherein music data that has been reproduced on the reproduction date whose difference value from the production date of the image data is minimal is determined as music data to be reproduced together with the image data.

7. The reproduction method according to claim 5, wherein the music data items that are received by a communication means which communicates with another device and are transmitted from another device or the reproduction history data items are stored in the data storage means.

8. The reproduction method according to claim 5, wherein the production date of image data is a pickup date of the image data picked up by a pickup means.

9. A program stored in a computer-readable medium and executable by a computer processor that causes a computer to execute reproducing processing of music data and image data, comprising the steps of:
   acquiring a production date of the image data appended to the image data, which has reproduction thereof instructed, out of the image data items stored in a data storage means that stores the music data items, the image data items to which the production dates of the music data items are appended, and reproduction history data items that are data items having the music data items and the reproduction dates of the music data items associated with each other;
   referencing the reproduction history data items stored in the data storage means, and determining the music data, which is reproduced together with the image data, on the basis of the reproduction dates of the music data items registered in the reproduction history data items, and the production date of the image data having reproduction thereof instructed; and
   producing reproduction history data by associating music data, which has been reproduced by a music reproduction means that reproduces music data, and the reproduction date of the music data, with each other, wherein:
   when the music data has been reproduced by the music reproduction means for a predetermined time or longer, the reproduction history data is produced by associating the music data and the reproduction date of the music data with each other.

* * * * *